(12) United States Patent
Markov et al.

(10) Patent No.: US 10,387,100 B2
(45) Date of Patent: Aug. 20, 2019

(54) MONITORING AND CONTROL DISPLAY SYSTEM AND METHOD

(71) Applicant: Topcon Positioning Systems, Inc., Livermore, CA (US)

(72) Inventors: Dimitre Markov, Holden Hill (AU); John Boal, Mawson Lakes (AU); Stefan Stefanov, Sheidow Park (AU); Andrew Walter, Payneham (AU); Heath Stephens, Lenswood (SA); Brian Sorbe, Jackson, MN (US); Michael Gomes, Rancho Murieta, CA (US)

(73) Assignee: TOPCON POSITIONING SYSTEMS, INC., Livermore, CA (US)

( * ) Notice: Subject to any disclaimer, the term of this patent is extended or adjusted under 35 U.S.C. 154(b) by 10 days.

(21) Appl. No.: 14/775,123

(22) PCT Filed: Mar. 13, 2014

(86) PCT No.: PCT/US2014/025764
§ 371 (c)(1),
(2) Date: Sep. 11, 2015

(87) PCT Pub. No.: WO2014/151453
PCT Pub. Date: Sep. 25, 2014

(65) Prior Publication Data
US 2016/0041803 A1    Feb. 11, 2016

Related U.S. Application Data

(60) Provisional application No. 61/790,974, filed on Mar. 15, 2013.

(51) Int. Cl.
*G06F 3/147* (2006.01)
*A01B 69/00* (2006.01)
(Continued)

(52) U.S. Cl.
CPC ............ *G06F 3/147* (2013.01); *A01B 69/001* (2013.01); *A01B 76/00* (2013.01); *H04N 7/18* (2013.01)

(58) Field of Classification Search
CPC ....... G06F 3/147; A01B 76/00; A01B 69/001; H04N 7/18
See application file for complete search history.

(56) References Cited

U.S. PATENT DOCUMENTS 6,064,943 A    5/2000  Clark, Jr. et al.
8,587,546 B1   11/2013  El-Khoury
(Continued)

FOREIGN PATENT DOCUMENTS

EP    2821864 B1      10/2015
WO    2009143294 A3   11/2009
WO    2014151453 A1    9/2014

OTHER PUBLICATIONS

International Search Report and Written Opinion dated Aug. 7, 2014, in connection with International Patent Application No. PCT/US14/25764, 6 pgs.
(Continued)

*Primary Examiner* — Alan D Hutchinson
(74) *Attorney, Agent, or Firm* — Chiesa Shahinian & Giantomasi PC

(57) ABSTRACT

A method and system for controlling a display in a machine operating in a work area. A plurality of views are displayed on a screen, each of the plurality of views corresponding to a plurality of functions. A user of the machine is allowed to simultaneously monitor the work area and control one or more of the plurality of functions by way of one or more of the plurality of views. The functions include one or more physical activities performed by an implement, connected to the machine, in the work area. The user is allowed to control, (Continued)

via the display, the one or more physical activities using software executed on the machine while monitoring the work area.

18 Claims, 29 Drawing Sheets

(51) Int. Cl.
  *A01B 76/00* (2006.01)
  *H04N 7/18* (2006.01)

(56) References Cited

U.S. PATENT DOCUMENTS

| | | |
|---|---|---|
| 9,541,905 B2 | 1/2017 | Nixon et al. |
| 9,671,954 B1* | 6/2017 | Jaugilas ................. G06F 3/044 |
| 2012/0256843 A1 | 10/2012 | Epple et al. |
| 2012/0324404 A1* | 12/2012 | Pahlavan ................ H04L 63/08 715/866 |
| 2013/0246946 A1 | 9/2013 | Iwasaki |
| 2014/0053094 A1 | 2/2014 | Grevinga et al. |
| 2014/0240506 A1 | 8/2014 | Glover et al. |
| 2014/0282229 A1 | 9/2014 | Laukkanen et al. |
| 2015/0052447 A1 | 2/2015 | Ritesh |
| 2015/0153456 A1 | 6/2015 | Feller et al. |

OTHER PUBLICATIONS

International Search Report and Written Opinion dated Jan. 24, 2017 in connection with PCT/US2016059127, 16 pp.

* cited by examiner

MONITORING AND CONTROL DISPLAY SYSTEM AND METHOD

RELATED APPLICATIONS

This application is a National Stage of International Patent Application No. PCT/US2014/025764, filed on Mar. 13, 2014, which claims priority to U.S. Provisional Patent Application No. 61/790,974, filed on Mar. 15, 2013, the disclosure of each is hereby incorporated herein in its entirety by reference.

BACKGROUND

1. Field

One or more non-limiting embodiments relate to a system and method for the simplified and personalized display and control of complex machinery.

2. Description of the Related Art

The control of sophisticated and complex machinery in a simplified system for display is of paramount importance. When an operator of a complex machine, such as a farm tractor needs to control multiple features and function of the device, that operator is often confronted with a technical overload. For example, in farm tractors, there are typically independent critical systems and independent interfaces for the tractor and also for an implement and/or attachment of the tractor performing work functions. These multiple systems often include independent monitoring capabilities. In other words, a first display may be tied to the tractor GPS navigation positioning, a second display may display liquid dispensing information, a third display shows the planter controls and a fourth, the tractor steering controls. There are thus four different displays each one of which controls a product; monitors material flow, monitors the tubes for distributing seed/inputs, or displays various selected camera views. The sheer quantity of consoles is not only difficult and confusing to use, but can also block the operator's critical view outside the tractor cab. Moreover, when an operator wants to make an adjustment he/she has to decide which console to touch or which button to touch. Instantaneous decision making also involves typical questions like "how do I change that parameter or address that problem?" or "how do I access the right information to change the parameter?" Often each display is too complicated or too inadequate to quickly address these questions.

SUMMARY

By contrast, one or more non-limiting embodiments of the present application brings together all of the information shown by multiple monitors into a single display.

Moreover, the display is not merely an aggregation of the information provided in the multiple separate screens. Instead non-limiting embodiments of the present application include systems and techniques for presenting information in a manner that enables an operator to easily navigate from one function set to another without undue inconvenience.

A further feature of non-limiting embodiments of the present application is that it enables an operator to personalize all the above noted elements on a single screen in a flexible and user friendly configuration easily and with a minimum amount of effort.

A further aspect of non-limiting embodiments of the present application is that the user interface presents multiple functions on a single display screen without the user losing information portraying the machine's working area.

Alternatively, if the operator wants the display to be as clutter free as possible, he/she can control the screen to bring up needed information, such as an alert or when an operating parameter is exceeded with a minimal sacrifice of a working area view.

As such, non-limiting embodiments of the present application provide a machine control display system and a display configuration methodology that enables an operator to efficiently and in a personalized manner see all aspects of the machine without confusion, without undue delay and without sacrificing a working view of the machine's operations.

Additional aspects will be set forth in part in the description which follows and, in part, will be apparent from the description, or may be learned by practice of the exemplary, non-limiting embodiments.

According to an aspect of a non-limiting embodiment, a method of controlling a display in a machine operating in a work area includes displaying, using a processor, a plurality of views on a screen, each of the plurality of views corresponding to a plurality of functions, and allowing a user of the machine to simultaneously monitor the work area and control one or more of the plurality of functions by way of one or more of the plurality of views.

The functions may include one or more physical activities performed by an implement, connected to the machine, in the work area.

The allowing may include allowing the user to control, via the display, the one or more physical activities using software executed on the machine while monitoring the work area.

The machine may be a tractor, and the plurality of functions controlled by the user may be performed by an implement connected to the tractor, the implement selected from a group consisting of a spreader for fertilizer, a planter of seed, a spraying device, a cutting edge to soil, and a forage harvester.

The method may further include determining a user-defined arrangement of one or more of the plurality of functions for the user, and presenting, on the screen, the unique user-defined arrangement as a home screen for the user.

According to an aspect of a non-limiting embodiment, an apparatus for controlling a display in a machine operating in a work area includes one or more processors configured to display a plurality of views on a screen, each of the plurality of views corresponding to a plurality of functions, and allow a user of the machine to simultaneously monitor the work area and control one or more of the plurality of functions by way of one or more of the plurality of views.

According to an aspect of a non-limiting embodiment, a non-transitory computer-readable medium storing a program for executing a method of controlling a display in a machine operating in a work area is provided, the method including displaying, using a processor, a plurality of views on a screen, each of the plurality of views corresponding to a plurality of functions, and allowing a user of the machine to simultaneously monitor the work area and control one or more of the plurality of functions by way of one or more of the plurality of views.

BRIEF DESCRIPTION OF THE DRAWINGS

The above-noted and/or other aspects of the present application will become apparent and more readily appre

DETAILED DESCRIPTION

Figure 1A:
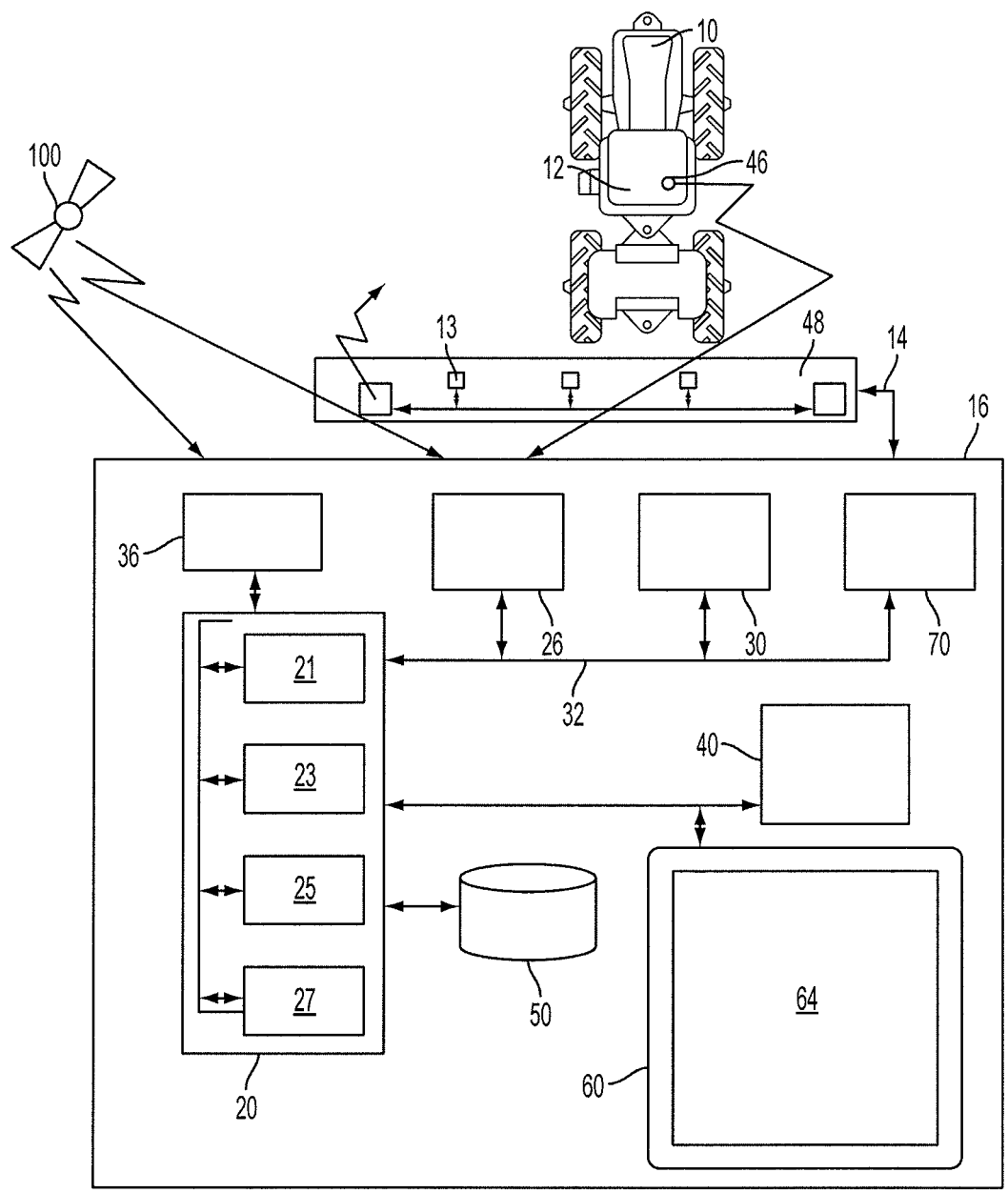
- FIG. 1A is a schematic diagram of the control system, according to a non-limiting embodiment.

Referring now to drawings wherein like reference numbers refer to like elements, FIG. 1A, which is a schematic diagram of the control system according to a non-limiting embodiment, shows a control system 16 for controlling an agricultural machine system 10 (e.g., a tractor). It should be understood that non-limiting embodiments of the present application have applicability to any complex or sophisticated type of machine. To illustrate the application of the non-limiting embodiments, however, implementation in an agricultural machine system 10 (hereinafter referred to as tractor 10) operating on a given land territory is shown in the present drawings. The mode of operation of the present control system for the tractor 10 are known to one of ordinary skill. Reference is made to the illustrated hardware elements which in combination with unique aspects of the interactive display capabilities as described herein form the inventive aspects of non-limiting embodiments of the present application.

As shown the tractor 10 includes the control system 16, which is typically installed in the tractor cab 12. The control system 16 is adapted to receive signals via connected bus or other transmission lines 14 to an implement 48 attached to the tractor 10. The tractor 10 can also incorporate a plurality of sensors (not shown) each of which are adapted to communicate via appropriate electrical connections, or wirelessly through antenna 46 or by other wireless means as is conventionally known. The sensors provide a plurality of control and feedback functions, including but not limited to, drive control, position control, implement control, feed level monitoring, spray control, camera images, camera positioning, reference line control, etc. It should be understood that non-limiting embodiments of the present application are designed to be incorporated with any types of conventionally known sensors and device controllers.

The sensors and device controllers receive and transmit control information through electrical connections to input/output unit 70, or wirelessly through receiver and transmitter 26 and 30 respectively. Control signals are processed in a conventionally known manner and are communicated via bus 32 to central control unit 20. The control unit can comprise a microprocessor and a dedicated processor which operate on or in conjunction with modules 21, 23, 25 and 27. Each module can consist of software, or programmed logic in a hardware device or some other form of dedicated controller device. The module 21 is a route control module which communicates with an external positioning controller 36 to receive and process GPS signals from satellite 100 or satellite groups (not shown).

Module 23 is a specialized module for handling and processing signals from sensor array 13 signals. The use of a specialized module 23 is critical for high bandwidth high speed processing. For example if sensor 13 provides live camera feed, module 23 processes received camera signals, and processes feedback control information in real time (e.g. position, zoom) for dedicated device controllers (not shown) on tractor 10.

Module 25 comprises the CPU which is adapted to perform numerous control tasks as described in connection with FIGS. 1B-25. Module 27 is a dedicated display control program or processor which interacts with touch display 60 and provides unique interactive control information on screen 64.

Drive control information is handled by drive controller 40 which interacts with control unit 20 to provide control feedback via connected or wireless signals to sensors and controller devices on the tractor 10 and the implement 48. The drive controller 40 is responsible for automatic drive control operations which enable the tractor to perform precise route movement based on information from the position controller 36. Position, drive, control and all other information can be stored in a memory (not shown) in the central controller 20, or in an attached memory device 50.

Figure 1B:
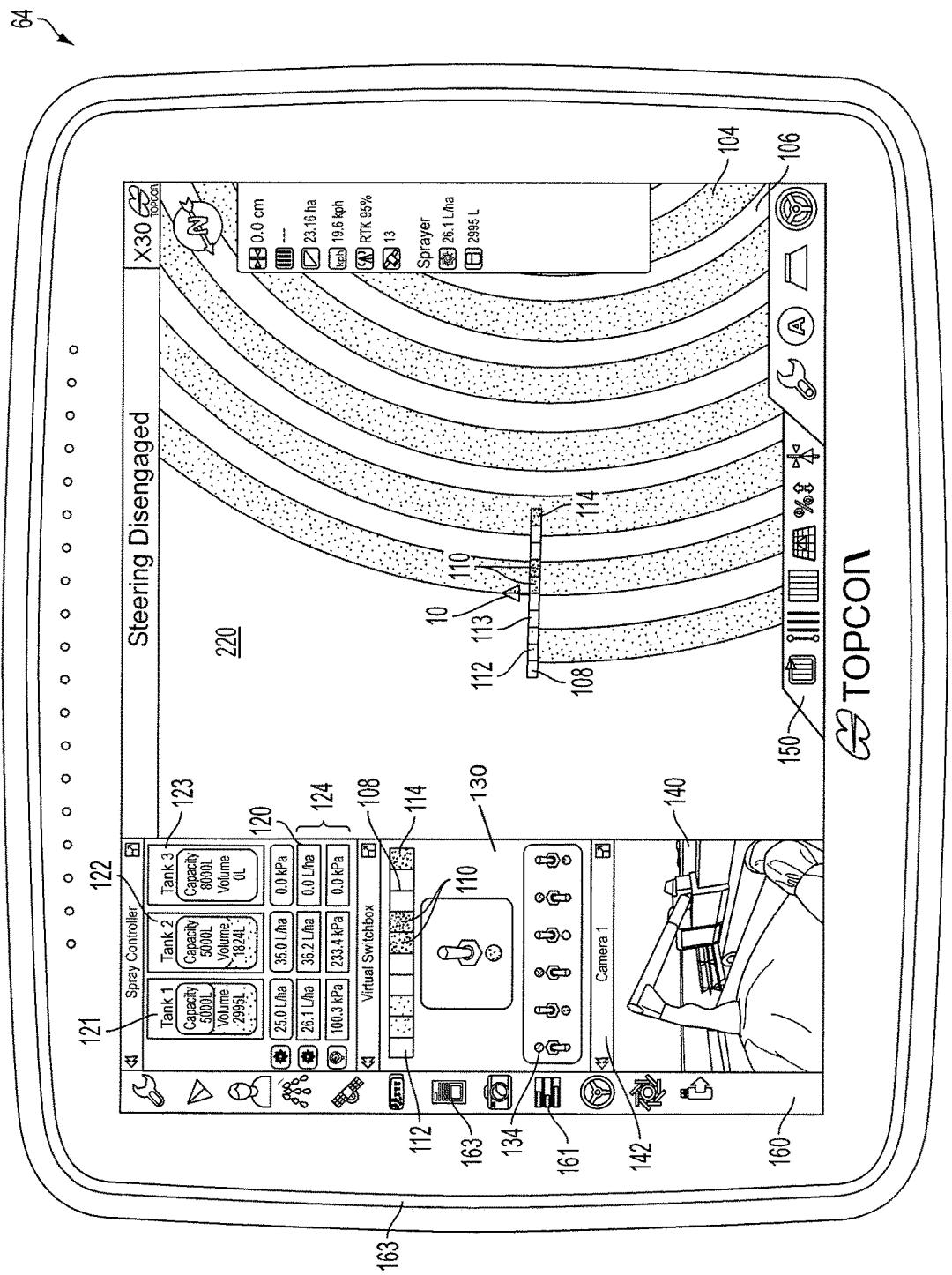
FIG. 1B illustrates the display with full open mini views and toolbars, according to a non-limiting embodiment.

FIG. 1B illustrates the display with full open mini views and toolbars, according to a non-limiting embodiment. For example, FIG. 1B shows the screen 64 for a vehicle, such as tractor 10, according to this non-limiting embodiment.

As noted previously, non-limiting embodiments of the present application are adapted for use on any machine control environment. With regard to agricultural machinery, for example, non-limiting embodiments of the present application can be incorporated into self-propelled combine harvesters, specialty crop harvesters, sprayers and tractors employing a variety of implements including spreaders for fertilizer, planters of seed employing various methods of dispersion, various types of spraying devices, cutting edges, forage harvesters and swathers, to name a few.

However, as noted above, non-limiting embodiments of the present application can be used in conjunction with control systems for any other types of complex machinery for agriculture, construction and other heavy industries. Examples include construction vehicles, ship or aircraft control systems, or even manufacturing or assembly lines where multiple views and parameters associated with the work area in which the complex machinery is operated are presented to the operator in an efficient and personalized configuration. It is noted that the work area can be any area in which the complex machinery operates such as land, sea, or air. The work area is typically outside the complex machinery.

In FIGS. 1B-25, the tractor 10 is represented by a triangle, operating in a field using section control through a GPS device. The area/section 104 is where vehicle implement 48 or toolbar 108 puts down materials and the area/section 106 is where the implement 48 or toolbar 108 skips, i.e. does not put down material. A tool bar 108 is shown located behind the tractor 10. The toolbar in this non-limiting embodiment includes a graphical representation of multiple tool areas $108_{1-n}$, such as spray heads, each of which could be colored on the display to represent a current state of operation. The tool bar control arrangement is similar to implement 48 shown in FIG. 1A. Specifically, certain areas of toolbar 108 show active tool zones 112, while other inactive areas 113 also are shown. In addition, areas of overlap 110 can be shown in a contrasting color. Certain areas of overlap can also represent a portion of a covered area 104, such as shown by a distinctly colored section 114 which for example, overlaps the area where material (e.g. seed, fertilizer) was previously spread.

On the far left of screen 64 are three mini-views 120, 130 and 140. The top mini-view area 120 is the spray controller display where three tanks 121-123 are shown. The tanks respectively are displayed with multiple related operational parameters that are measured by an on-board sensor, as is known in the industry. In the exemplified mini view the following parameters are displayed in area 124: liters per hour, liters per minute, and the bar pressure readings for each respective tank 121-123. More details regarding mini view 120 will be described below.

A second mini-view area 130 displays a virtual switch box that shows the operational status of the toolbar 108; for example, which sprayer is turned on and which sprayer is turned off. If a user were to touch individual switches 134 in mini view 130, the individual switch would change the sprayer mode instantly. So if a user were to touch one of the switches 134, the dispenser would promptly turn on in toolbar area 112 and then the tractor 10 would start dispensing materials at that particular section 104. Meanwhile the switch color changes to reflect the new operational state.

Toolbar 108 and its respective work areas are replicated in the mini-view 130 above the virtual switchbox. The purpose of the repetitive view is to enable an operator to easily align toolbar area status with respective control switches. As a result, the operator can make precise alignments both between switches and tool areas, and also see evidence of the tool status change along rows 104 and 106 in the implement work area 220. All of these views are shown on one page of one display. Moreover, fingertip controls can affect large working areas with ease. For example, if the tool bar 108 is forty feet wide and there are ten sections $108_{1-10}$, each section 104, 106 could be four feet long and can respectively handle two individual load units (as shown by 114) that are each two feet in width for each section and could each be performing different tasks. So an operator can overlap half of section 104 while leaving the other half unaffected or treated with a different material. The user can thus intentionally overspray or double seed area 114 without resorting to complex multi-screen monitoring of the affected areas.

The third mini-view 140 represents a camera view 142 (entitled camera #1). The importance of the camera relates to being able to observe many types of equipment, particularly where size is significant. For example, if a rolling bin of seed (part of the implement 48) is pulled by the tractor 10, a camera would be essential since it would be difficult for the operator to see into a bin that is 60 feet behind the tractor cab. Moreover, even if a physical view were feasible, the user would still be required to stop the tractor in order to physically turn around to make a detailed observation of the seed bin. With a camera, the user can still look and see when they have to fill up the tender bin and then take it with them without stopping the tractor. Use of a camera allows the user to relate the progressive controls on screen information with the actual state of the equipment to access proper normal operation during the course of a specific job.

As shown, the onboard control capabilities are designed to handle multiple systems at once. For example, the tractor 10 and the implement 48 may be a multiple product dispensing liquid fertilizer device, or the implement 48 may be putting down a combination of fertilizers and different herbicides while also planting seeds into the ground. Because of the way the tractor 10 transfers the seed from the tender bin up to the areas that are planting them, there may be fans for blowing the seed and operating parameters associated with controlling the speed of those fans.

A further unique aspect of non-limiting embodiments of the system is that it allows for simultaneous viewing, monitoring and adjustment of the controlled device.

More particularly, one of the advantages of the mini view arrangement is that it enables the operator of a complex machine to view multiple complex functions on a single screen and to monitor the field of operation 220 simultaneously. As a result, the work of multiple displays, each dedicated to the function represented by a single mini view in the instant invention, is avoided. More critically, the user can control each mini view and thus each respective function easily without losing the fine tuning capabilities typically associated with a dedicated monitor with a minimum of interruption and thus a minimum of error.

Importantly, the mini views can be arranged and personalized by each operator in a flexible and simple manner. Any machine tool function can be shown in the mini view format for any type of complex device requiring a screen monitor for operation.

Examples include: Overhead view. Overhead view as positioned upon a map of intended work. Agricultural machine examples include planter, seeder, air seeder, sprayer, spray boom positioning system, systems that sense and optimize force with which an implement 48 is impacting the ground terrain, etc. As previously noted, non-limiting embodiments of the present application can be deployed with any type of machine as is conventionally known in the art.

Referring back to FIG. 1B, to the left of the mini-views, there is the single vertical bar that displays tool icons 160 which are used in conjunction with the various mini views. For example, system diagnostics icon 161 is selectable to show the machine's work progress. A user, for example, may want to understand how much area 220 the implement 48 is covering and how much area remains to be covered; to this end, job statistics as shown by icon 163 are made available on the screen when selected.

It should be noted that while the present embodiment shows only three mini-views, other combinations are feasible. For example, a larger number of mini views would be feasible with higher resolution display screens. A given machine such as a complex aircraft control display, or a harvester may require many mini views, and those would be configurable by the manufacturer and/or individual operator as desired.

Moreover, non-limiting embodiments of the present application can go back and forth between views. Maybe there is concern about camera one and the user can see only half of the inside of the bin. The user can then easily switch to another camera by pressing on the camera bar 142. Then the camera mini view 140 can be closed because the rate control shown in mini view 120 for example needs to be adjusted. Non-limiting embodiments of the present application have the ability to overlay multiple mini-views although it may be practical in certain circumstances to only view several at any one time. It should also be noted that a user can also assign priority of viewing for the mini-views upon setup. Automatic modes may be enabled allowing various views to be viewable on the main screen, on a regular timed interval, or based upon other operations specific parameters such as progress of the job, nearing the end of a particular job, anticipatory view prior to requiring an in-field turn, etc.

The bottom area of screen 64 functions as a "dashboard" or viewable area 150, where selected operating parameters can be displayed and monitored. This dashboard can be located on any available side of the display area. Unique aspects of the dashboard 150 allow for the user to determine which functions they would like to view through selection. Once selected, the parameter remains in view during normal operation—allowing the machine operator to view it at a glance. The dashboard provides separate functionality from the mini-views. For example, adjustments on the bottom dashboard 150 can be dedicated to engaging or disengaging the steering, and engaging/disengaging the coverage maps, or changing the view of the map.

Figure 2:
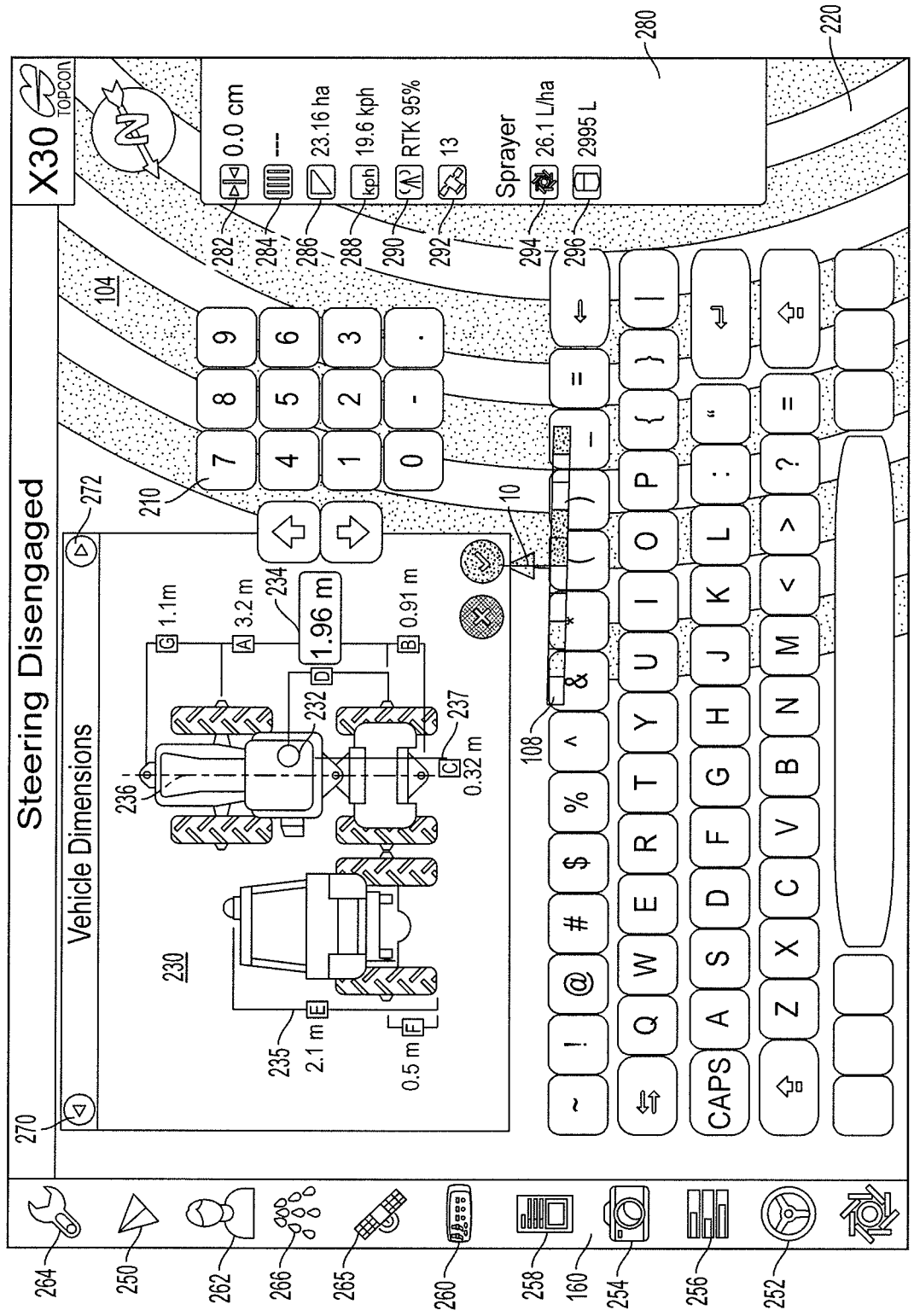
FIG. 2 illustrates a small display opened to show vehicle dimensions, according to a non-limiting embodiment.

FIG. 2 illustrates a small display opened to show vehicle dimensions, according to a non-limiting embodiment. Referring to FIG. 2 the dashboard 280 on the right side of screen 64 is activated by the wrench icon 264 and the keyboard 210 and setup screen 230 folds out over the top of the working screen 220. The set-up screen 230 provides specific tractor dimension measurements, including the location of the GPS antenna 232 (shown in reference to the rear axle of the tractor 234).

The vehicle dimensions include a center line which is important in showing the receiver 232 offset 237. Because the GPS system is critical to all aspects of the tractor steering and position controls, the operator needs to know where the center of the antenna is and its height 235 relative to the tractor base. Moreover, its position provides the operator with an ability to specify multiple aspects of vehicle geometry, which are necessary for understanding turns and turning radius, etc.

The offset control may be automatic. For example, the system may have a user profile or it may have individual vehicle profiles that store and automatically set the off-set. An offset may, for example, be only two feet, or these measurements can be manipulated or set by the users. One of the unique aspects of this non-limiting embodiment of the present application over prior systems is that a user pulls screen 230 up, and by doing so, avoids changing the overall machine display. In other systems, changing a vehicle dimension setting requires the operator to turn to another page of the display, thus losing operational continuity. In this non-limiting embodiment, changing a vehicle dimension is accomplished by super-imposing dimensional data 230 over the top of the working screen 220. Alternatively, the vehicle set up can be shown on a separate screen from the working screen (not shown). As a result, the operator never leaves the working screen 220, and never loses view and/or control of the position of the tractor 10 or the working bar status 108.

The tools associated with the dashboard 280 located to the right of the working area 220 are now described. The position of each toolbar can be configured by the operator as desired. In the exemplified dashboard 280, the first icon 282 represents the cross-track error. In the exemplified screen, the cross-track error shows 0.0 centimeters. The implement 48 is thereby dead-on or within a centimeter of its desired target. Icon 284 indicates what row or line 104 the implement 48 is on. Icon 286 shows how many acres or hectares the implement 48 has covered of the working area 220. The speedometer icon 288 shows that the implement 48 is traveling 19.6 kilometers per hour. The signal real time kinematic (RTK) reception is 95% as represented by icon 290. That represents signal reception that is within 7 centimeters of accuracy. As shown by icon 292, the user currently is receiving satellite data for navigational reference. For example, as shown here, icon 292 illustrates positioning using satellite data from 13 satellites. The sprayer status measurements are also shown in the dashboard 280. For example, icon 294 shows that the sprayer is dispensing material at the rate of 26.1 liters per hectare. Tool icon 296 shows an operator how much material has been dispensed by the sprayer (e.g. 2,995 liters).

The left vertical tool bar 160 controls the mini-view data as well as the set up screen. As noted previously, the operator can configure the tool bar to not only be located in different areas of the screen 64, but control or monitor any function that they choose or that are provided by the manufacturer of the machine.

Wrench icon 264 activates a separate area of the user interface (not shown). To engage the auto steering, the user presses steering wheel icon 252. To turn on or off the camera as shown in mini view 140 of FIG. 1, the user activates the camera icon 254. To understand job statistics, a user would activate the job form icon 258. The virtual switch box as shown by mini-view 130 in FIG. 1 is in turn turned on or off by icon 260. To understand all of the sound related features of the display, a user would activate the sound icon 265. Another feature is the user profile 262, which can display numerous user data points, such as, for example, the user's work hours. The icon 250 changes the view point shown on the screen. To change the overhead to the heads up view, a user would activate the little off triangle which may be colored. By doing so, a user is accessing the icons to pull up a working screen. User can then select various view perspectives including but not limited to overhead, landscape, northern centric, job heading centrics, etc. Tool icon 266 represents materials stored or sprayed as shown by mini-view 120 in FIG. 1.

Thus, as shown, this non-limiting embodiment illustrates super imposing the work over the top of the working screen 220. The user, therefore, rarely has to exit the working screen 220 to control the machine. To close the vehicle dimension view 230 the arrow 270 is activated, which moves vehicle dimension screen 230 over to the left side of screen 64, which in turn tells the system that the user is finished with that page. The user would be right back on the home screen page 64 with a single push of a button 270.

The arrangement can be configured differently by an operator. For example, the mini-views could be re-arranged to not be on the left, but on the right side of the display. Alternatively, the user can stack mini-views in rows across the top of the screen 64. Also, the present display could be any size. In the preferred embodiment, the screen used is 12 inches in diagonal with a display resolution of 104×768. However, any size screen and resolution is contemplated.

Figure 3:
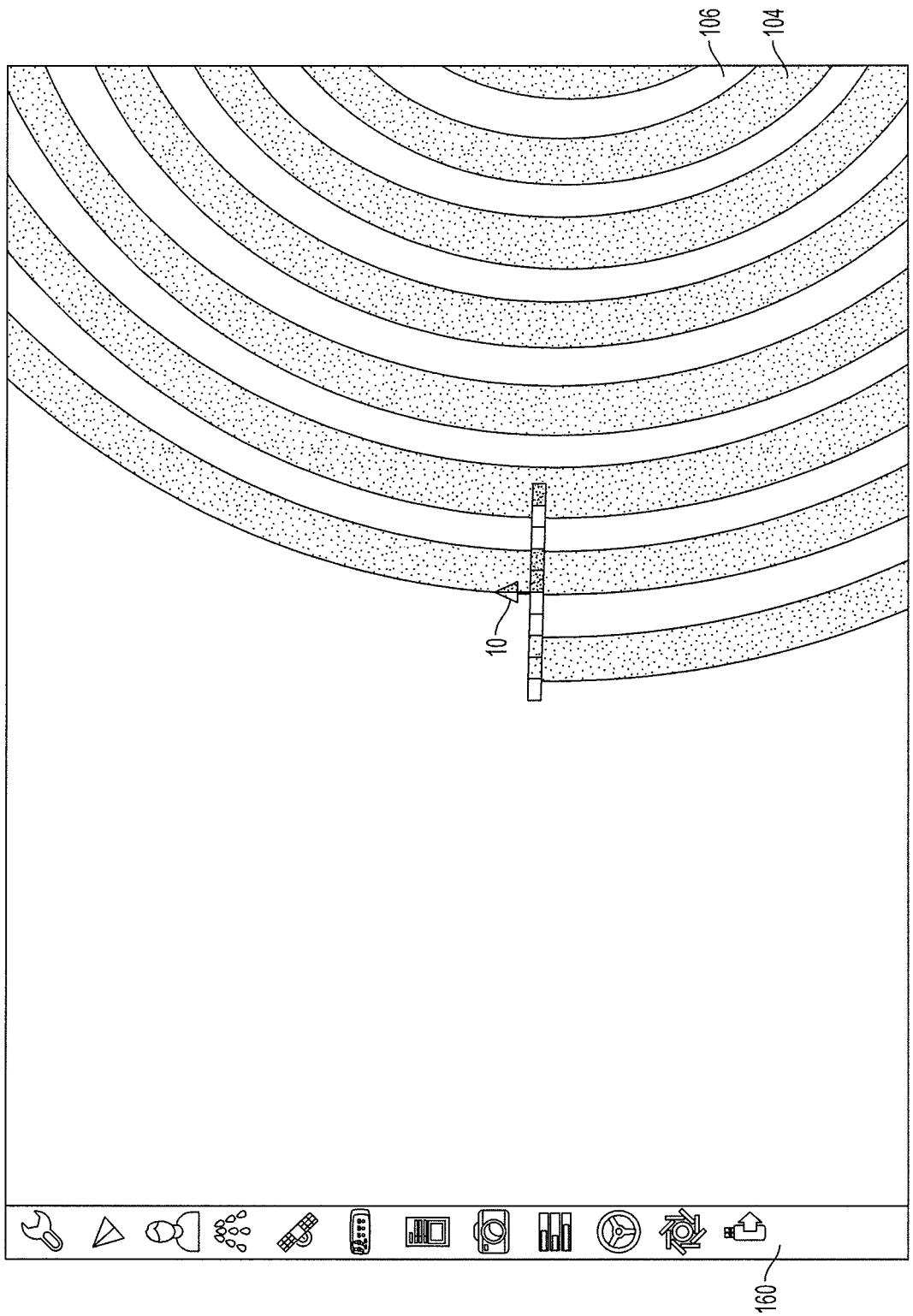
FIG. 3 shows the display guidance map with navigation bar in view, according to a non-limiting embodiment.

FIG. 3 shows the display guidance map with navigation bar in view, according to a non-limiting embodiment. In particular, FIG. 3 illustrates a screen showing the Guidance Map with Navigation Bar 160 and dashboards and mini-views closed. A user can add to the arrangement of elements or subtract from the arrangement of elements on screen 64 as he/she sees fit. This non-limiting embodiment allows the user to determine the arrangement of elements and the order of the arrangement of elements on the screen 64.

Relatively simple graphical elements can invoke sophisticated information that can be fairly in-depth and unique characteristics can also be created by the user.

One of the problems the present application solves is that in order to control sophisticated complex machinery a uniquely simple system for display and control is critical. For example, imagine sitting in the operational seat of the tractor and on the user's far right hand side are four different displays and each one which controls a product, monitors feed, monitors the tubes that distribute seed/soil, or provides camera views. On the operator's right side, the view is blocked by those four consoles. When an operator wants to make an adjustment they have to decide which console to touch. For example, in many agricultural tractor cabs, there are typically independent interfaces to control different equipment. A first display may show the camera views, a second display maybe the liquid dispensing rate, the third display the planter controls, etc. By contrast, non-limiting embodiments of the present application brings together all of these disparately represented elements in a single display. One of the problems solved by non-limiting embodiments of the present application is that it enables the operator to see, access, and personalize the user interface. As exemplified in FIGS. 1-2, the operator can personalize the screen display to show many mini views. On the other hand, if an operator wants the screen to be clean, simple, and as clutter-free as possible as shown in FIG. 2, the screen can be personalized to display a minimum of information, except that which is necessary (e.g. machine alarm condition).

Personalization includes choosing the display of certain control elements, arranging those elements, allowing each user to determine their own unique default view for the same machine, allowing the operator to determine his own user preferences the way he likes to see them. The invention further allows an operator with the push of a button (not shown) to engage memory so that the desired arrangement becomes their personal default home screen. When another operator gets in the machine, then the screen display reflects the personalized characteristics previously stored in the system's memory set by the second operator. For example, the second operator may not like a clean screen shown in FIG. 3. Instead, they may like to see all of the mini-views and tool bars shown, for example, in FIG. 1A. This invention, therefore, involves arranging, selecting, being able to determine a unique user defined arrangement and being able to return to that unique user determined arrangement as a default or home setting.

Figure 4:
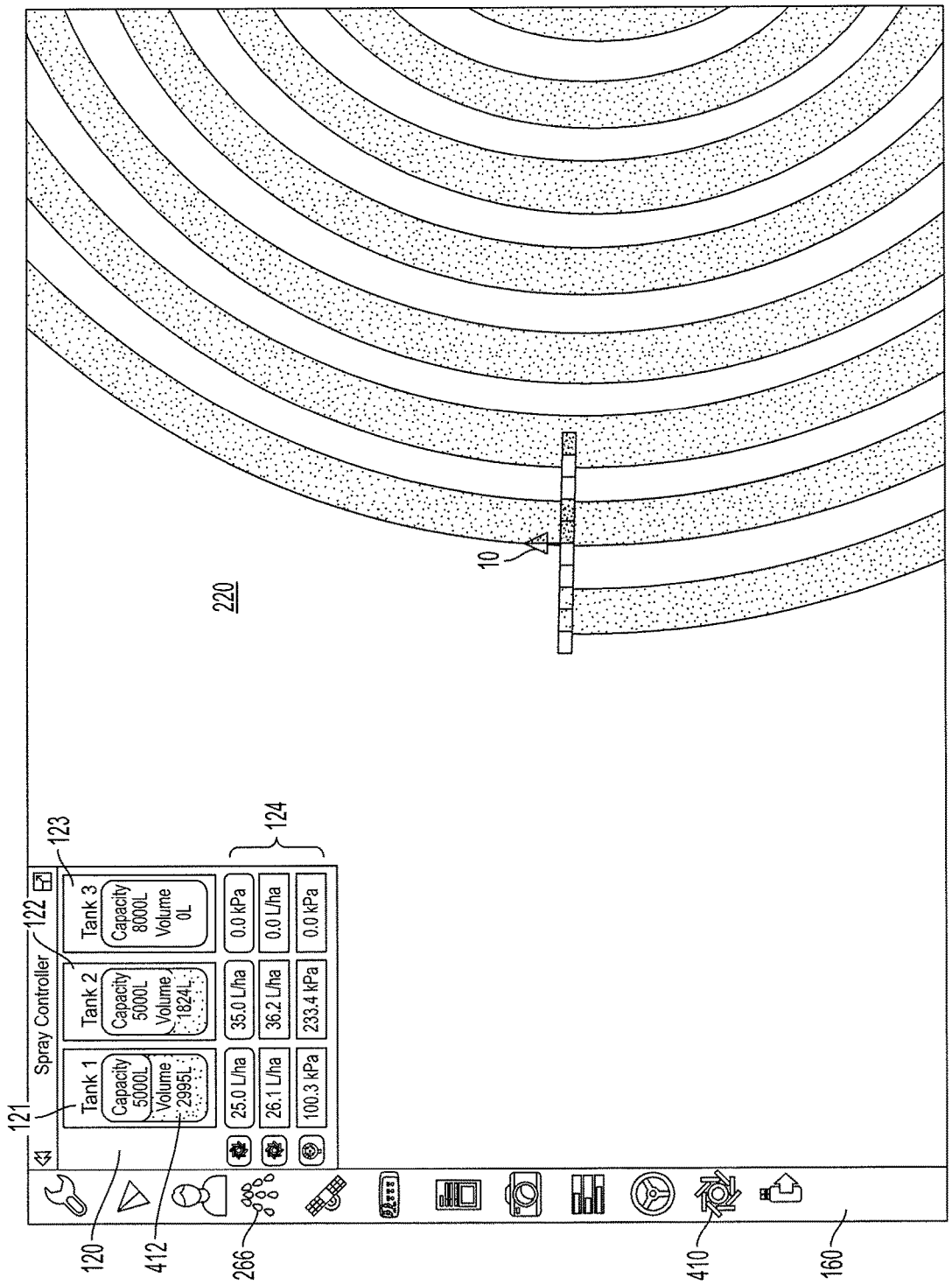
FIG. 4 illustrates the display with fixed size windows presenting interactive status information of the spray controller as a mini view, according to a non-limiting embodiment.

FIG. 4 illustrates the display with fixed size windows presenting interactive status information of the spray controller as a mini view, according to a non-limiting embodiment. In particular, FIG. 4 illustrates the activated mini-view 120 of the spray controller. The mini-view is activated by touching icon 410 on toolbar 160 which brings up the rig control showing three tanks 121, 122 and 123 respectively. For each tank, the capacity is illustrated showing the remaining volume 412 icon representation (both as numerical and simulation volumes). However, the tanks can be re-arranged as the user sees fit. For example, if the user wants to move the second tank 122 to the left, move the first tank 121 to the middle and leave the third tank 123 over to the right, the tanks 121-123 are easily re-arranged by dragging each over by finger to the desired location. As the tank is moved, the numerical information below each tank slides alongside. Therefore, the operator can not only view, but dynamically rearrange the view configuration easily, in real-time, while continuing to monitor the progress of the implement 48 in the working area 220.

It should be noted that non-limiting embodiments of the present application can be implemented in different hardware platforms, including PDA devices, such as iPads, mobile phones, tablet computers, personal computers, stand-alone monitors, etc. Moreover, non-limiting embodiments of the present application have the capability of being implemented or viewed on multiple types of equipment, including remotely located equipment. A user can push a button over on the far left side for help from the remote home office (not shown). A user may push the button for example to tell the technician in the control room, "I'm real happy with these two operating parameters, but I'm not sure about this operating parameter." The supervisor in the control room, in turn pulls up his version of the operating screen in the control room, and also may remotely activate an additional camera on the machine to check into the user's question and say, "That looks like you're operating a bit taller through the field" and then remotely make an adjustment for the user in real-time.

Figure 5:
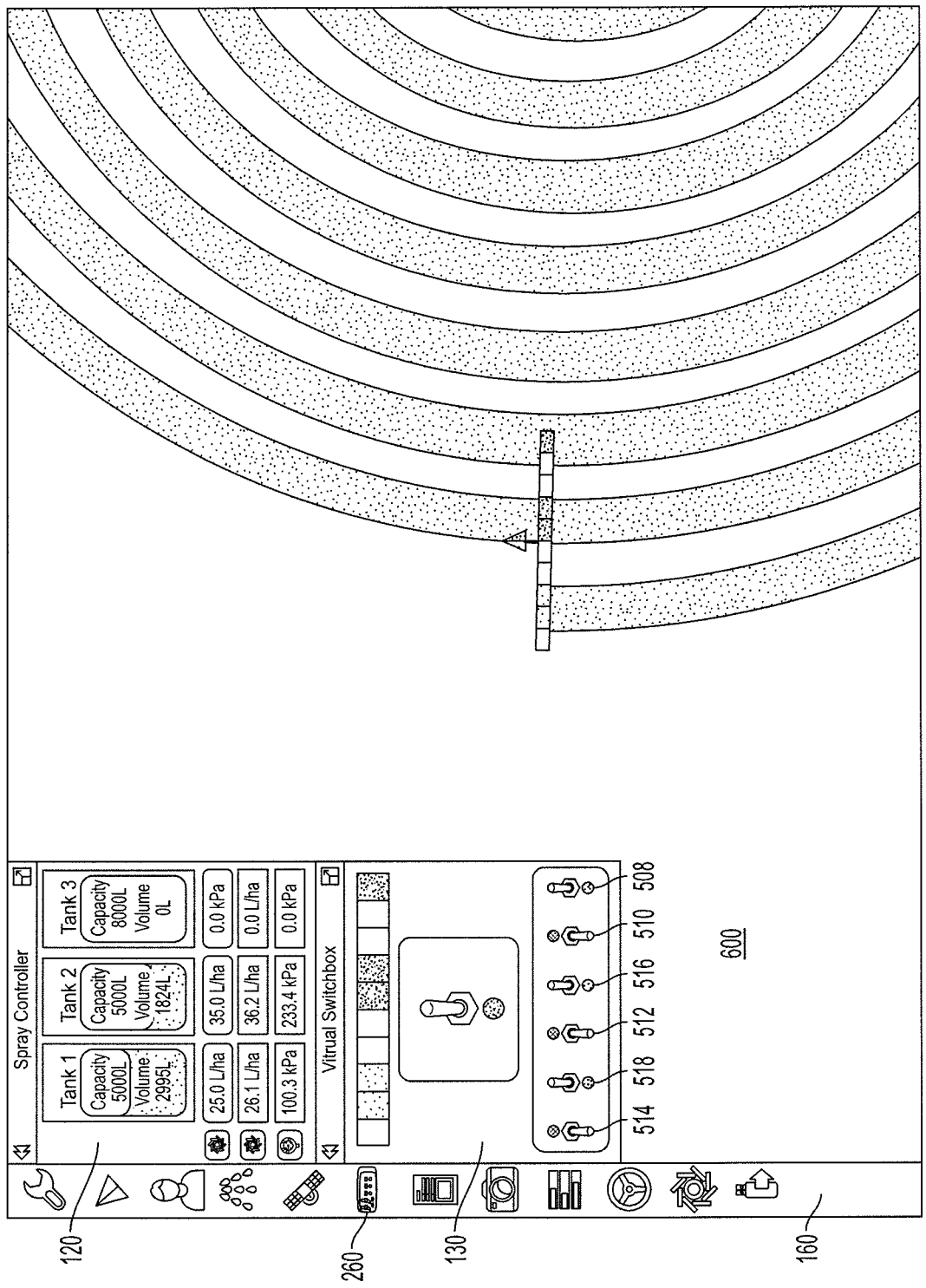
FIG. 5 shows a display screen with the second stacked mini view of the virtual switchbox function, according to a non-limiting embodiment.

FIG. 5 shows a display screen with the second stacked mini view of the virtual switchbox function, according to a non-limiting embodiment. In particular, FIG. 5 illustrates the virtual switch box mini-view 130 which is stacked below the spray controller mini-view 120. As shown, when the icon 260 is activated, the virtual switch box mini-view 130 appears to the right of the toolbar 160. Switches 510, 512 and 514 may be shown in one color (e.g., red) and switches 508, 516 and 518 may be shown in another color (e.g., green). Unlike the spray controller mini view 120 which has the capability to allow an operator to easily change the arrangement of elements, the virtual switch box 130 switch positions remain fixed because the switches are hardwired aspects of the machine that cannot be re-arranged without changing toolbar altogether.

As shown, those elements are stacked on the working screen, but in a non-active area 600 of the working screen 220, so that then they are visible, but not blocking the operator's view of the working area 220.

Figure 6:
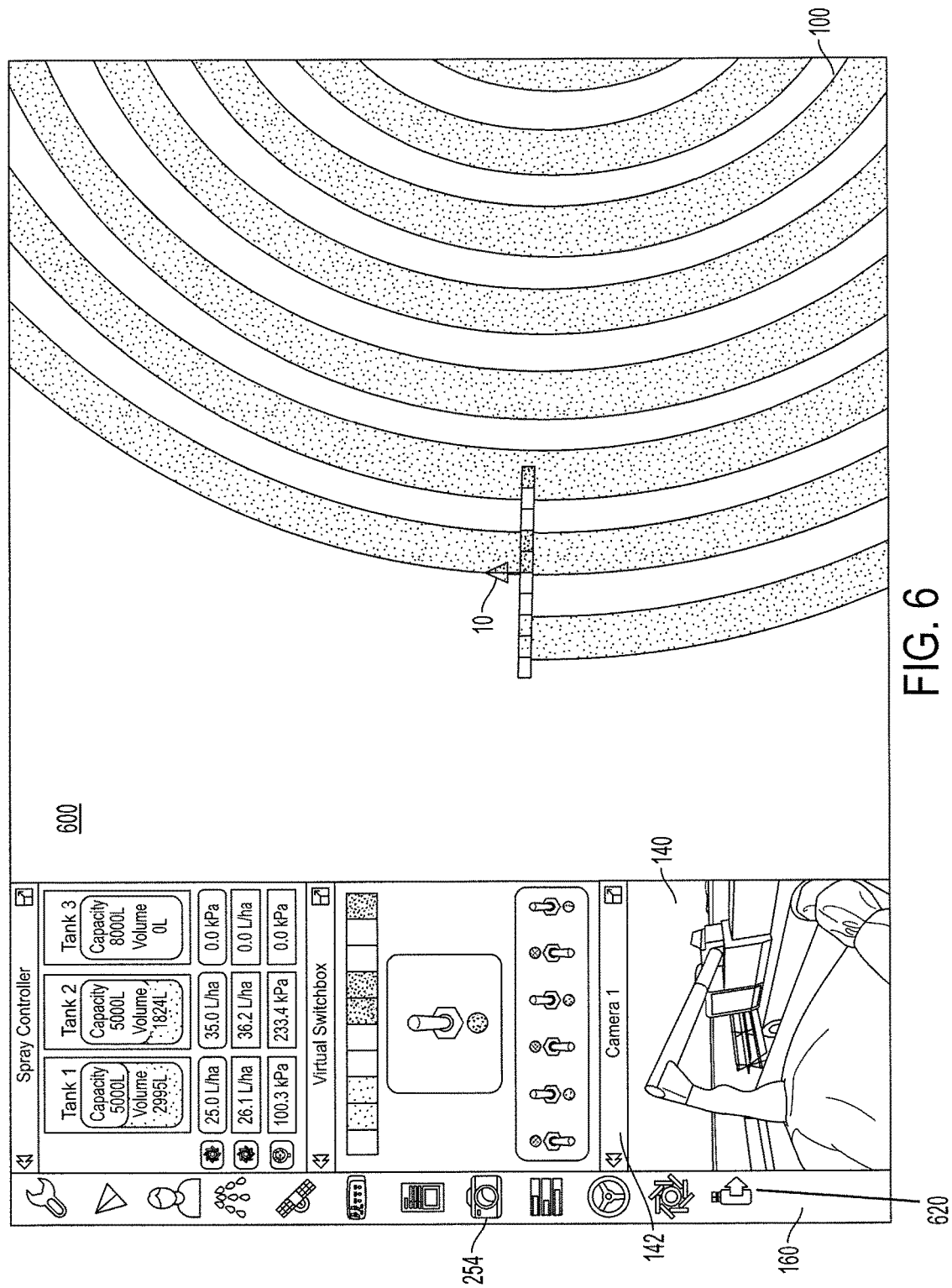
FIG. 6 is the display screen showing the third stacked mini view of the live video camera feed, according to a non-limiting embodiment.

FIG. 6 is the display screen showing the third stacked mini view of the live video camera feed, according to a non-limiting embodiment. Referring now to FIG. 6, the user can activate the camera icon 254 on toolbar 160. The mini-view 140 then displays a view from camera #1 as shown below title bar 142. In use, an operator can put his finger on mini view 140 and control the camera movement in the direction that the operator drags his finger across the mini view 140.

Icon 620 returns the tractor 10 to the center of the working screen and automatically closes the stacked mini views 120 130, 140.

Figure 7:
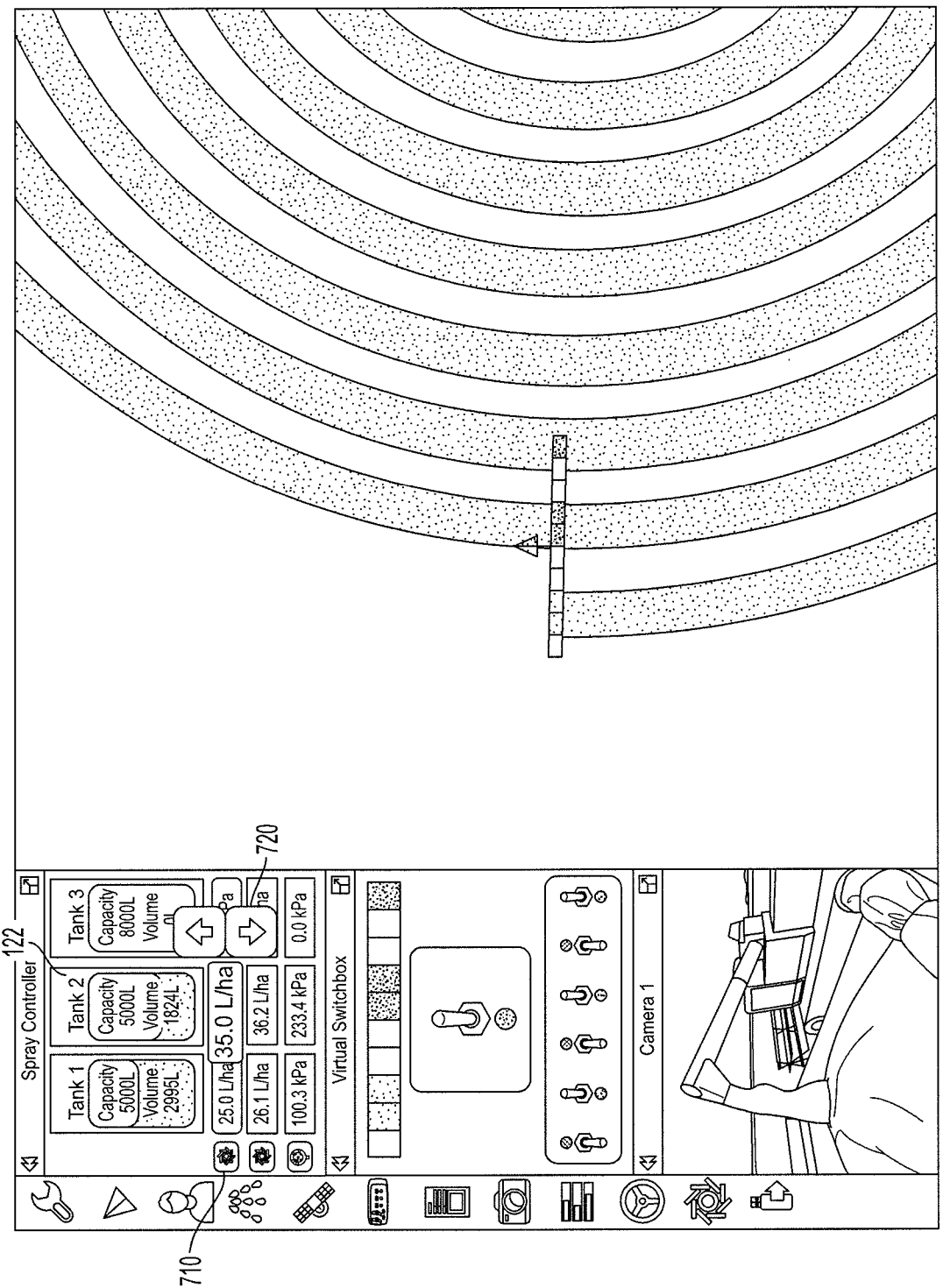
FIG. 7 illustrates the user interface showing the touch screen interaction with the operator and the mini views, according to a non-limiting embodiment.

FIG. 7 illustrates the user interface showing the touch screen interaction with the operator and the mini views, according to a non-limiting embodiment. With respect to FIG. 7 the operator can control parameters easily by using a touch control to expand, contract or move a desired parameter on the display. For example, if the user wants to make fine tuning adjustments to tank 2 (122), the user touches the blue icon 710 and then touches tank 2. In this embodiment, icon 710 represents tank flow rate control. Once touched, the value below tank 2 is shown in exploded view with adjustment arrows located adjacent the exploded value. The user can then adjust the flow rate (35.0 L/ha) by pressing the up/down arrows 720, as desired.

Figure 23:
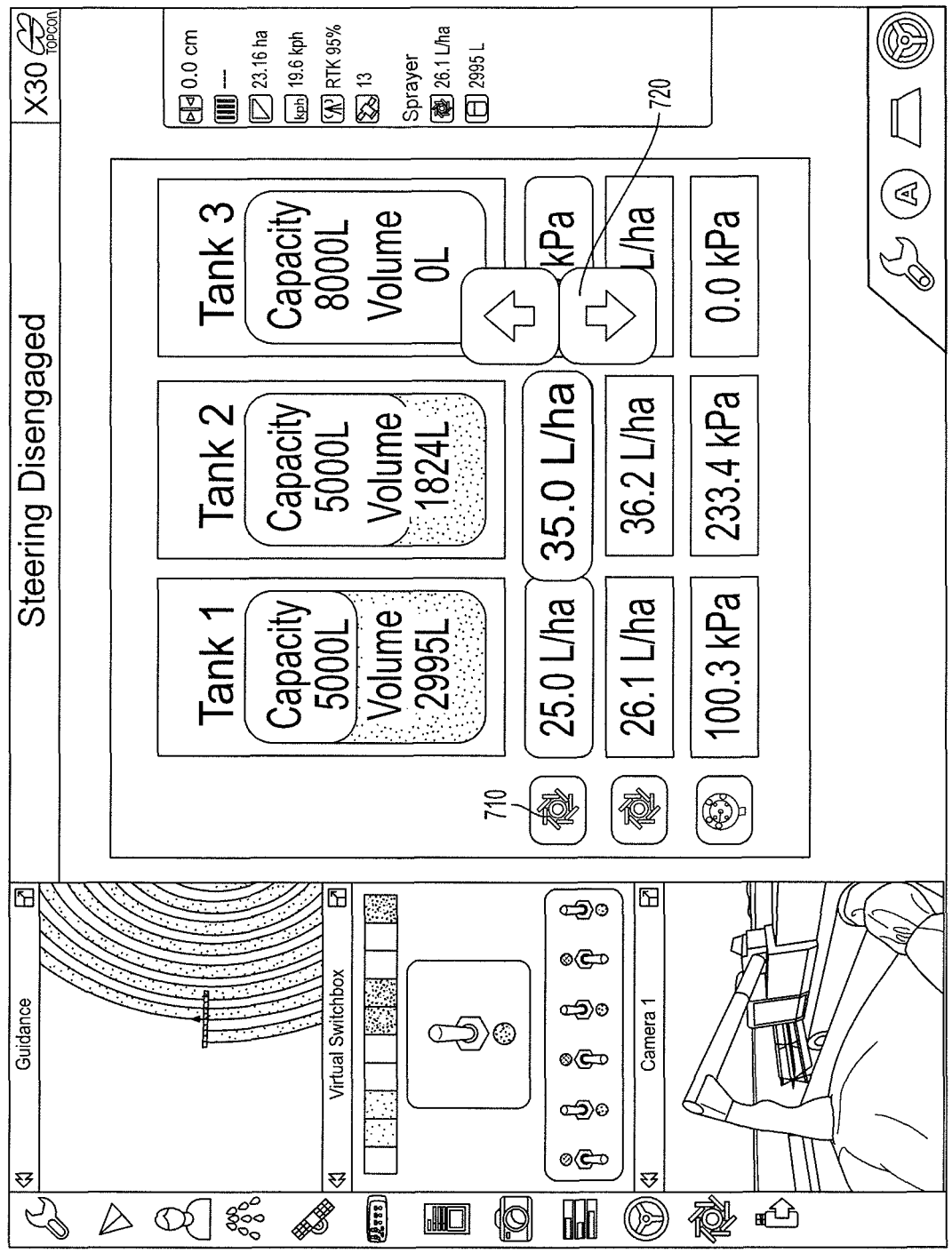
FIG. 23 discloses the screen display enlarged layout, according to a non-limiting embodiment.

FIG. 23 illustrates the screen display enlarged layout, according to a non-limiting embodiment. In particular, FIG. 23 shows that the operator can also select an enlarged view of the adjustment arrows 720 to make adjustments easier. Again, the rate control is shown being dispensed from Tank 2 122 at 35 liters per hectare. By touching the area below tank 2 on the same row as blue icon 710, in a single button touch, the user has the ability to make instant adjustments up or down. Those adjustments may also be entered in increments that the operator pre-sets. Thus, using one button, an operator can change multiple parameters.

Figure 8:
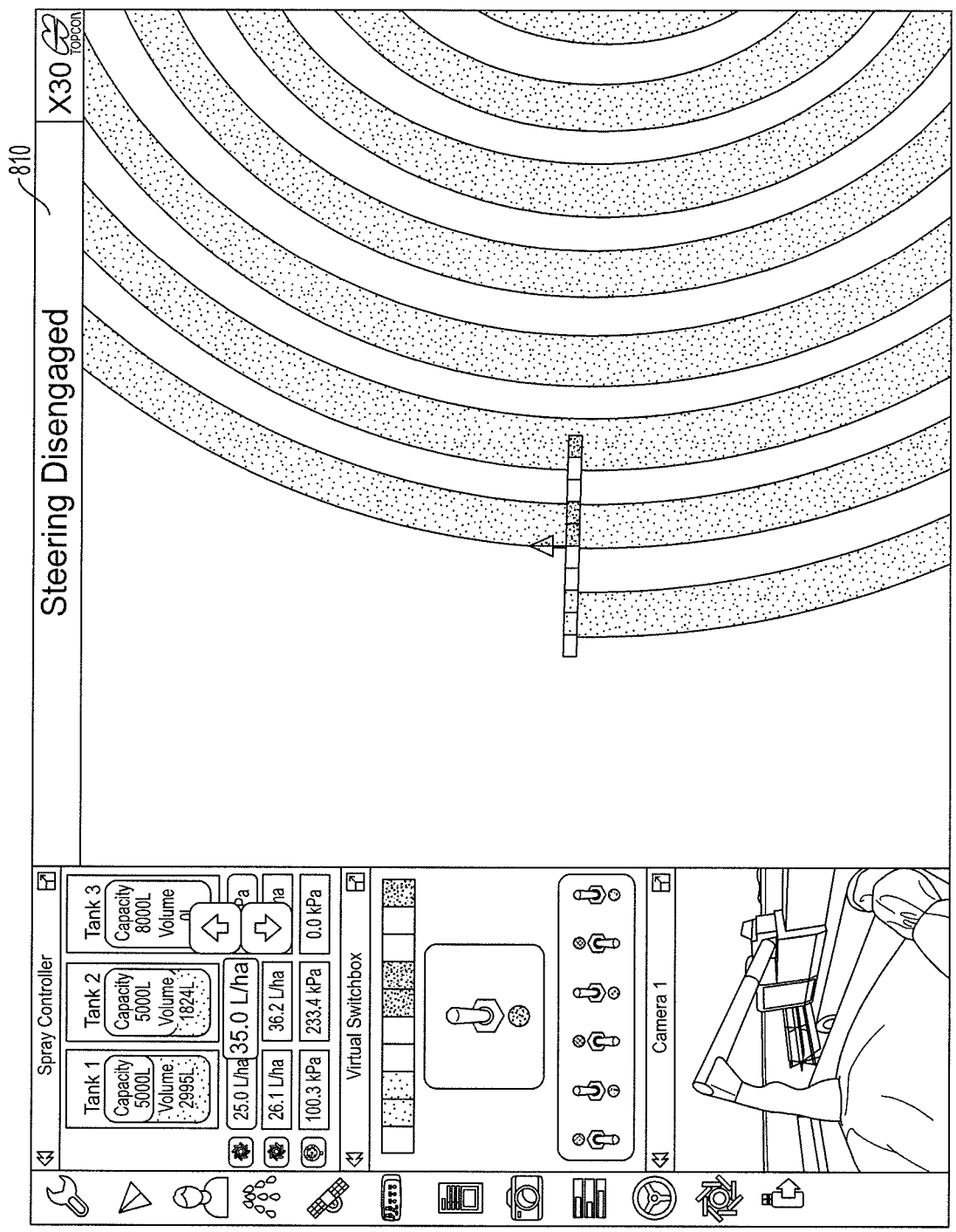
FIG. 8 shows the user display with the alarm conditions displayed in the flashing title bar which is clickable to dismiss the alarm, according to a non-limiting embodiment.

FIG. 8 shows the user display with the alarm conditions displayed in the flashing title bar which is clickable to dismiss the alarm, according to a non-limiting embodiment. In particular, in FIG. 8, an alarm condition is displayed in the flashing title bar 810 providing the operator with feedback that the steering of the tractor 10 is disengaged. The operator can then acknowledge the alarm by touching the title bar 810 which in turn automatically dismisses the alarm. The user interface can use combinations of colors, words and various elements in succession or patterns to help them understand both warning and important operational aspects of the control system.

Figure 9:
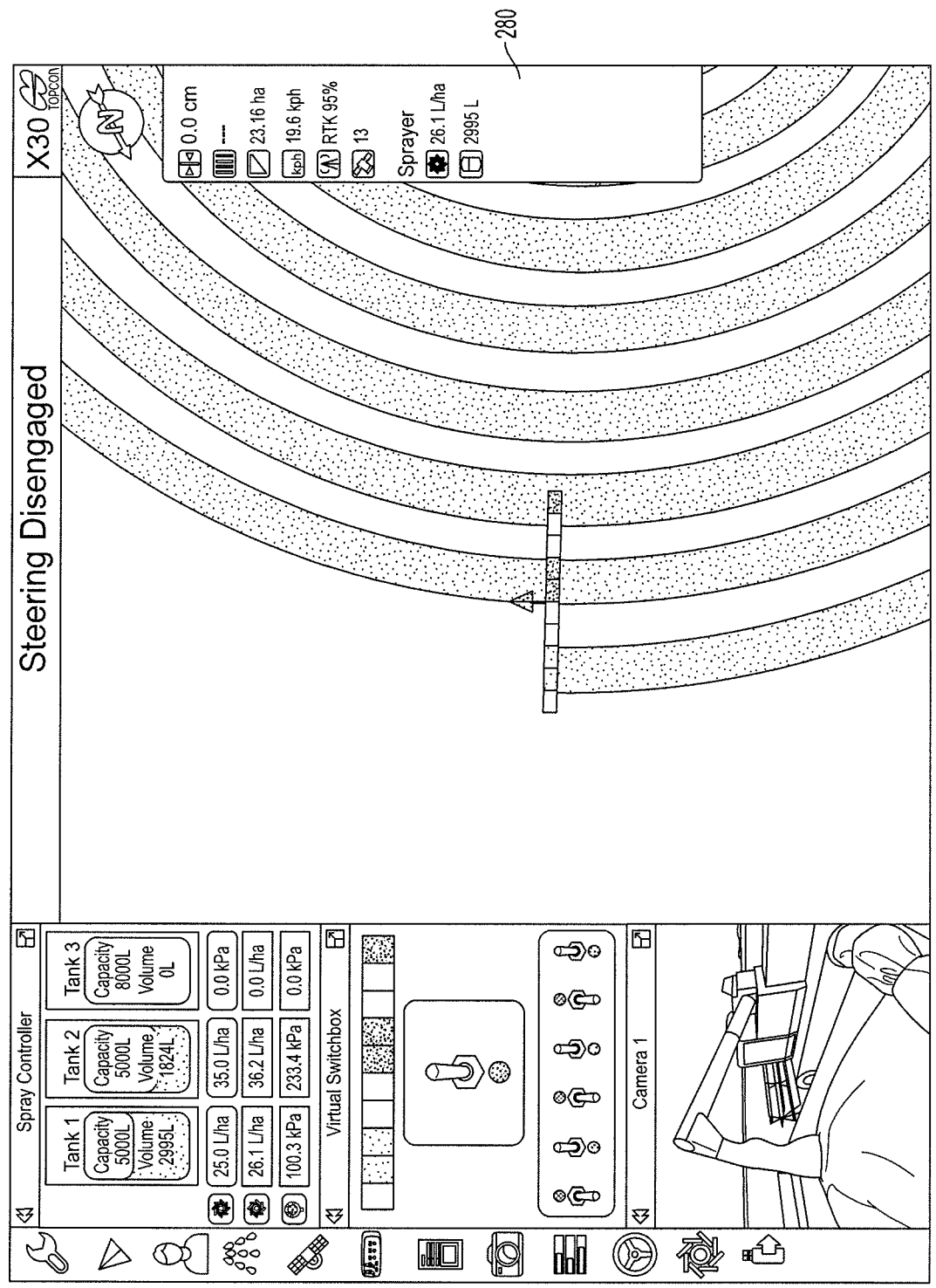
FIG. 9 shows the user interface display with the dashboard showing current stats and a resize capability as more entries are added or removed, according to a non-limiting embodiment.

FIG. 9 shows the user interface display with the dashboard showing current status and a resize capability as more entries are added or removed, according to a non-limiting embodiment. FIG. 9 displays the dashboard 280 which generally shows current unit status and resizes as more desired parameters are added or removed by the user. The actual font and element size may become larger or smaller depending upon the number of viewable elements selected, allowing for easy and comfortable viewing by the equipment operator.

Figure 10:
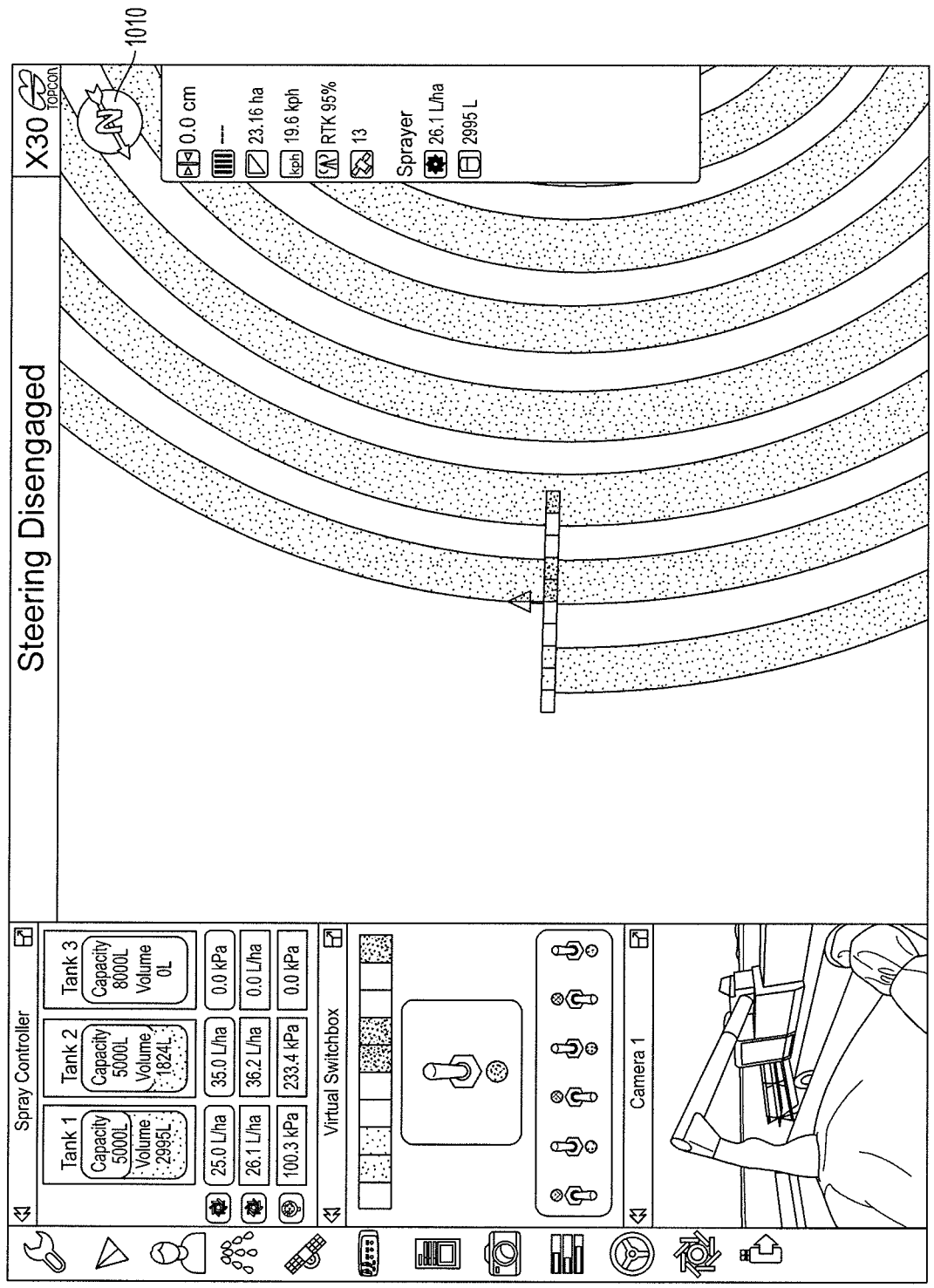
FIG. 10 illustrates the overhead view of the display utilizing a guidance compass, according to a non-limiting embodiment.

FIG. 10 illustrates the overhead view of the display utilizing a guidance compass, according to a non-limiting embodiment. In particular, FIG. 10 shows compass 1010 providing guidance by pointing north. The compass icon may be utilized to help the operator understand heading and direction, depending upon operational modes selected. This function is valued by operators when determining or establishing a guidance wayline, utilizing compass course heading as the primary characteristic to determine direction of the wayline.

Figure 11:
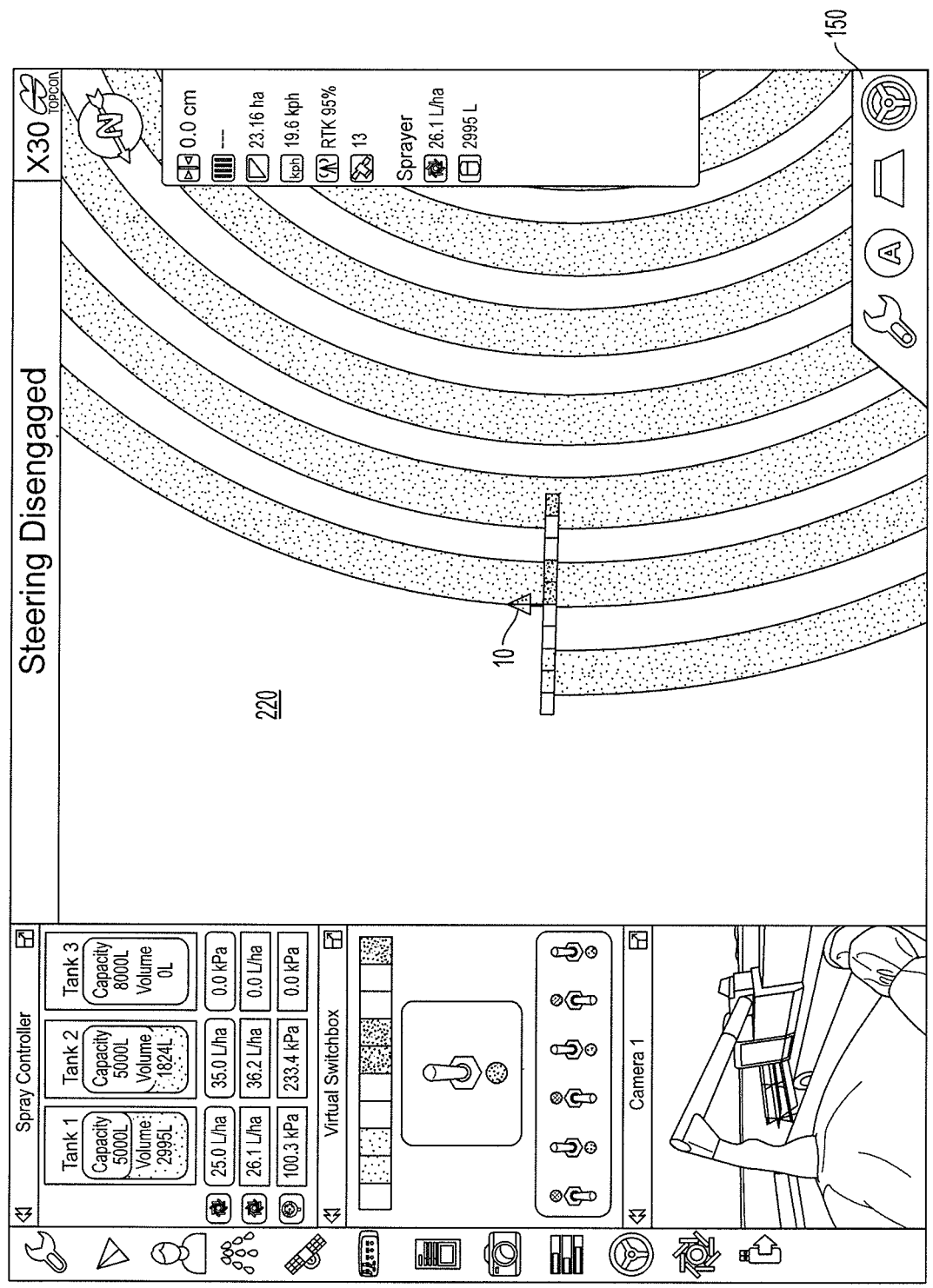
FIG. 11 shows the screen display with the system wide toolbar, according to a non-limiting embodiment.

FIG. 11 shows the screen display with the system wide toolbar, according to a non-limiting embodiment. In particular FIG. 11 shows the system wide toolbar 150 which, when activated, displays several different features as will be described further below.

Figure 12:
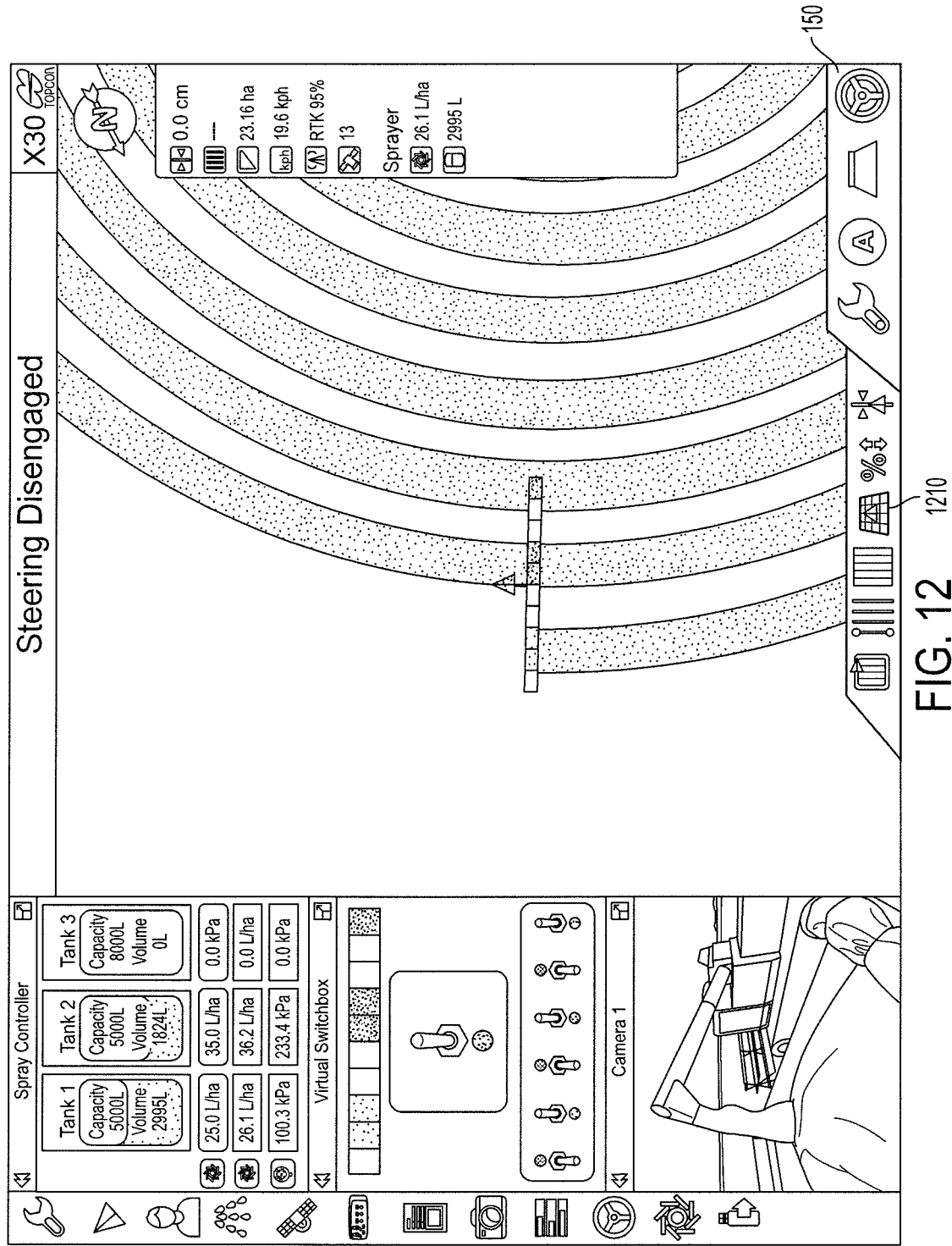
FIG. 12 shows the graphic user interface with the full screen application toolbar and guidance screen options, according to a non-limiting embodiment.

FIG. 12 shows the graphic user interface with the full screen application toolbar and guidance screen options, according to a non-limiting embodiment. In FIG. 12, the dashboard 1210 can also expand in substantial alignment with toolbar 150.

Figure 13:
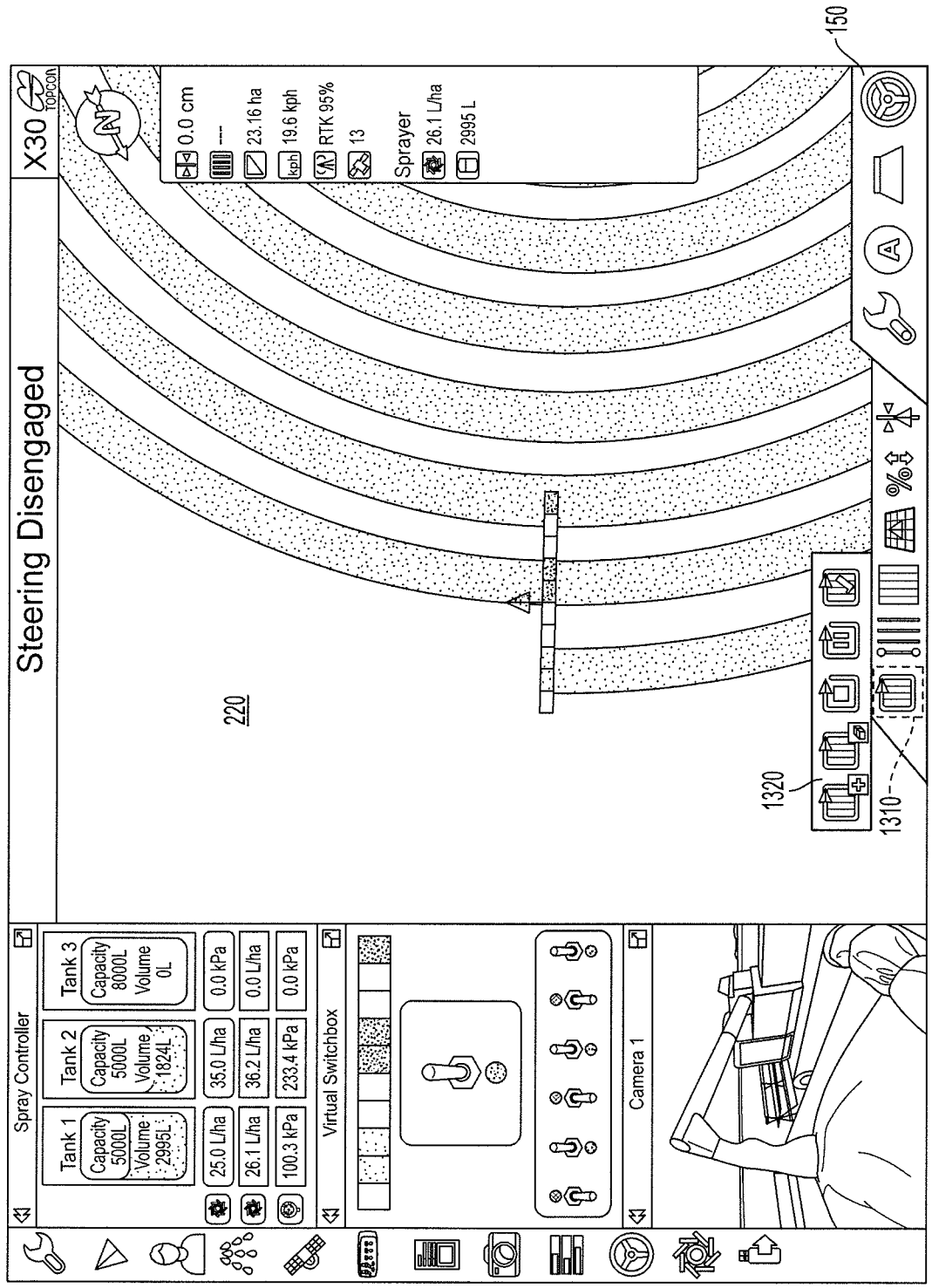
FIG. 13 illustrates the graphic display with the application toolbar submenu horizontal extension layout, according to a non-limiting embodiment.

FIG. 13 illustrates the graphic display with the application toolbar submenu horizontal extension layout, according to a non-limiting embodiment. When dashboard element 1310 as illustrated in FIG. 13 is activated, various user selection icons 1320 are pulled out over the top of the working screen 220 in a horizontal layout.

Figure 14:
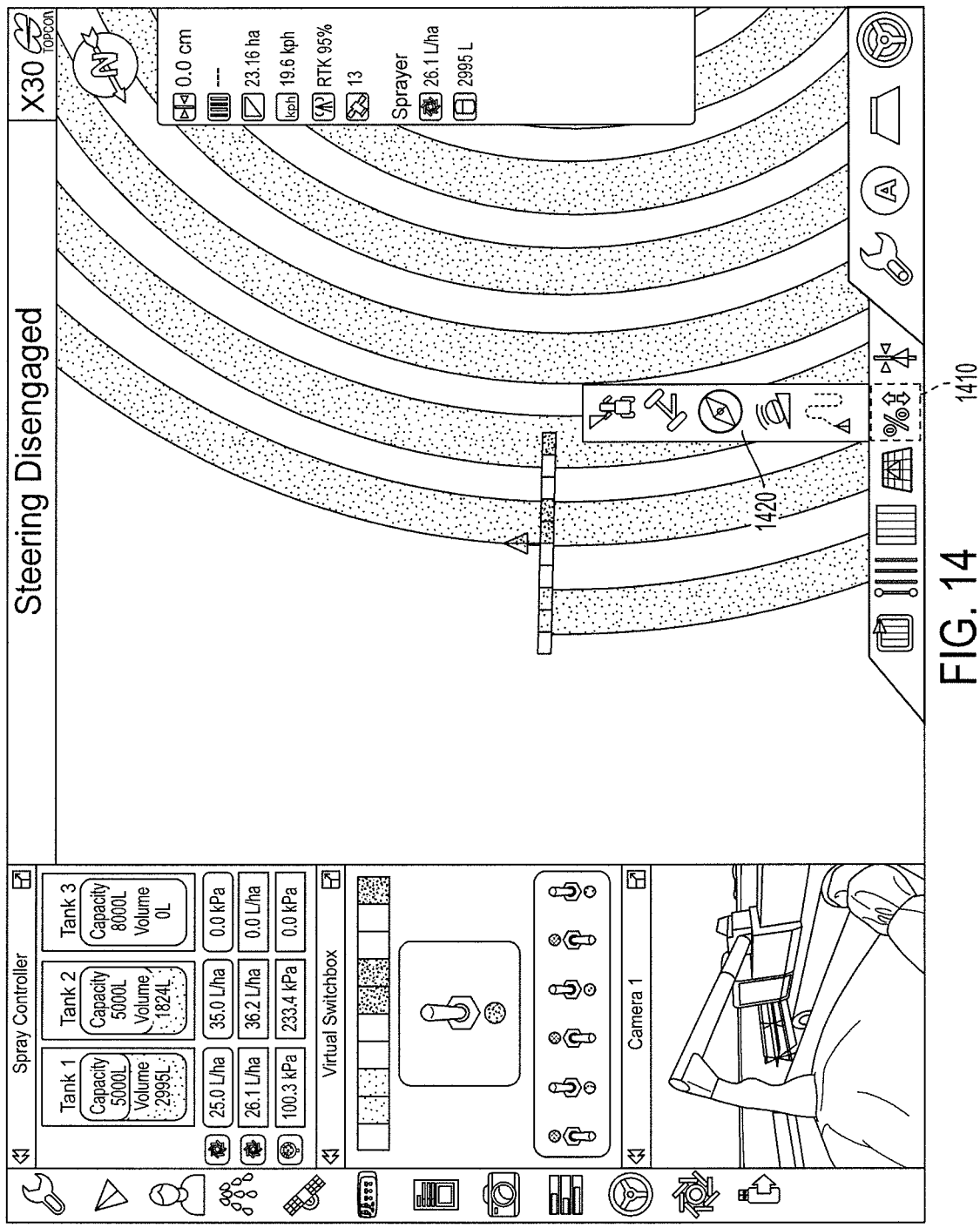
FIG. 14 shows the display application toolbar submenu having a vertical layout, according to a non-limiting embodiment.

FIG. 14 shows the display application toolbar submenu having a vertical layout, according to a non-limiting embodiment. In particular, FIG. 14 shows the same expansion capability in vertical layout 1420 as opposed to the horizontal layout shown in FIG. 13. This element may also be resized for easy viewing, depending upon the number of elements selected. In addition, the user may uniquely order the arrangement of elements within the toolbar as a user configurable setting that can then be saved and recalled. Horizontal and vertical elements (i.e. toolbars, dashboards) can both be shown on the display simultaneously to distinguish the hierarchy of function or adjustment. This makes the on-screen adjustments to the user intuitive to maximize operation and control.

Having the option for a horizontal layout and a vertical layout helps the user understand that he is making a first-level or a second-level adjustment, i.e., an adjustment inside of an adjustment. The operator is able to accomplish fine tuning while remaining on the same working screen 220. This provides both intuitive adjustment and also minimal confusion as the operator remains on the home working screen throughout.

Figure 15:
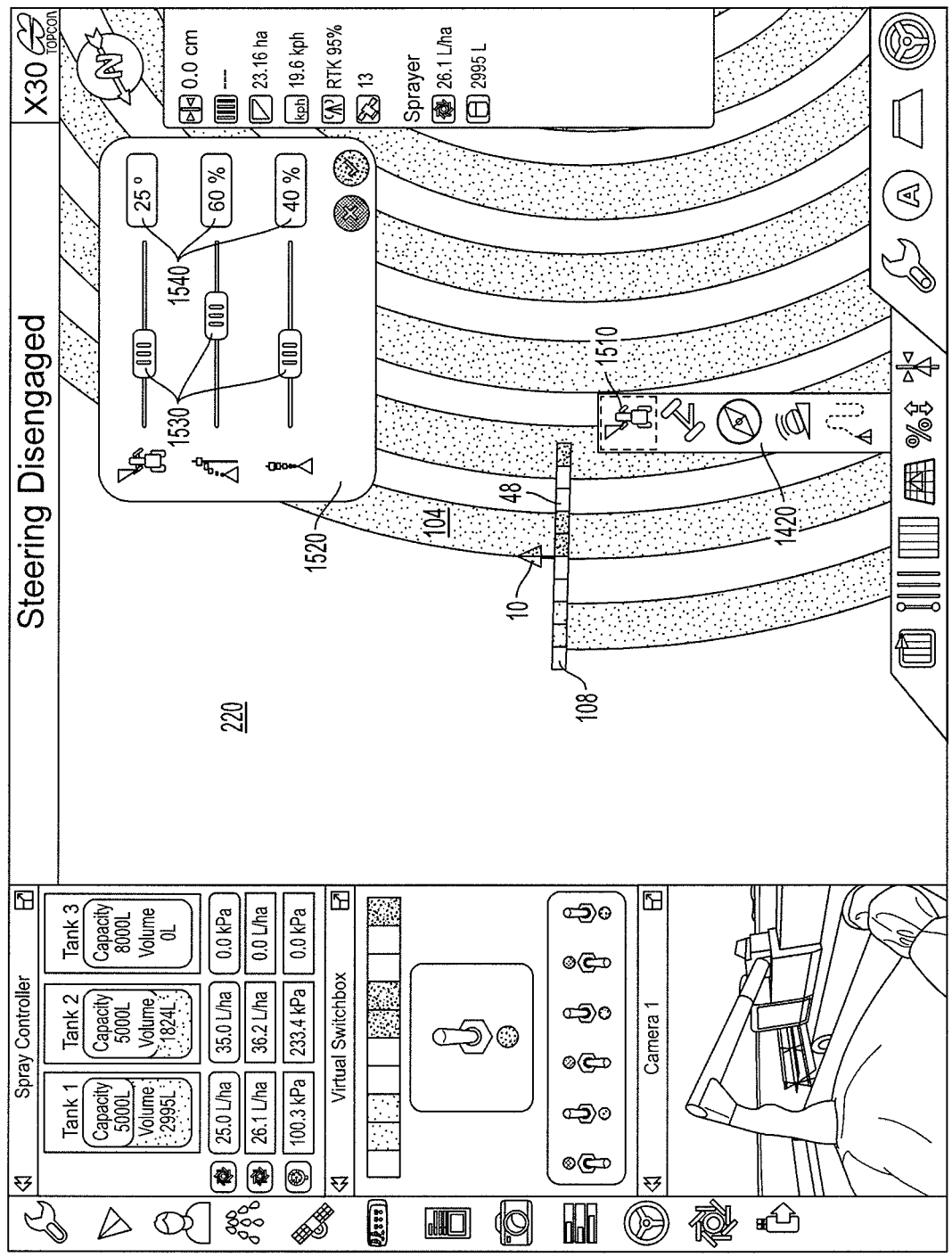
FIG. 15 illustrates the tuning screen display with the tuning options available while driving the vehicle, according to a non-limiting embodiment.

FIG. 15 illustrates the tuning screen display with the tuning options available while driving the vehicle, according to a non-limiting embodiment. FIG. 15 illustrates a further fine tuning option available to the operator by activation of icon 1510 on vertical element 1420. This action pulls up slider bar display 1520 over a substantially inactive portion of work area 220, away from implement 48. The display 1520 also has a projective capacity since the user can move slide 1530 and the on-screen slider position and corresponding numeric value 1540 are both displayed. Both gestures and adjustments utilizing multiple touch points on the interface screen can be accomplished through this embodiment, as a combination of both hardware and intuitive software. Again, fine tuning is achieved in a way that maximizes the display of critical data, eases the act of adjustment and at the same time maintains a view of the working area 220. As a consequence, the operator is able to accomplish real-time tuning with a minimum of error while continuing to operate the tractor 10.

In this embodiment, the slide bars 1530 are activated by touching the turning radius control icon 1510 on vertical tuning bar 1420. The radius icon represents the rate at which the implement 48 comes on-line and the aggressiveness for on line course corrections are made while traveling down the row 104. Such adjustments can be made while the vehicle is in an operational mode, which in turn allows for intuitive adjustment by the operator.

In certain applications, the operator may desire to repeat rows and in certain instances there can be a significant economic incentive to repeat these same rows in subsequent years following the same navigational wayline with tolerances, for example, of within an inch or less. However, if the toolbar 108 is vibrating slightly, an online adjustment may be warranted. Hence, a fine tuning operation 1420 may be activated to make operating parameters adjustments. If the user waits some number of seconds, the fine tuning operation will disappear. Intuitively allowing the adjust mode to be discontinued without requiring operator input to close the adjustment mode.

As a consequence of the present display configuration, fine tuning does not necessitate the use of a multi-page display. A user thus avoids, for example, looking at a stack of four different consoles on his right-hand side to decide which one to touch in order to make a fine adjustment and then having to open up several separate set-up screens in order to make the actual adjustment. Many more minutes are taken up by this cumbersome operation, while the implement 48 remains idling since the display takes up all of the user's attention. All aspects of control and adjustment are therefore provided in a single user screen, with on-screen adjustments, using multi-touch capabilities while the work area remains conspicuously present so that machine operation is not interrupted.

Figure 16:
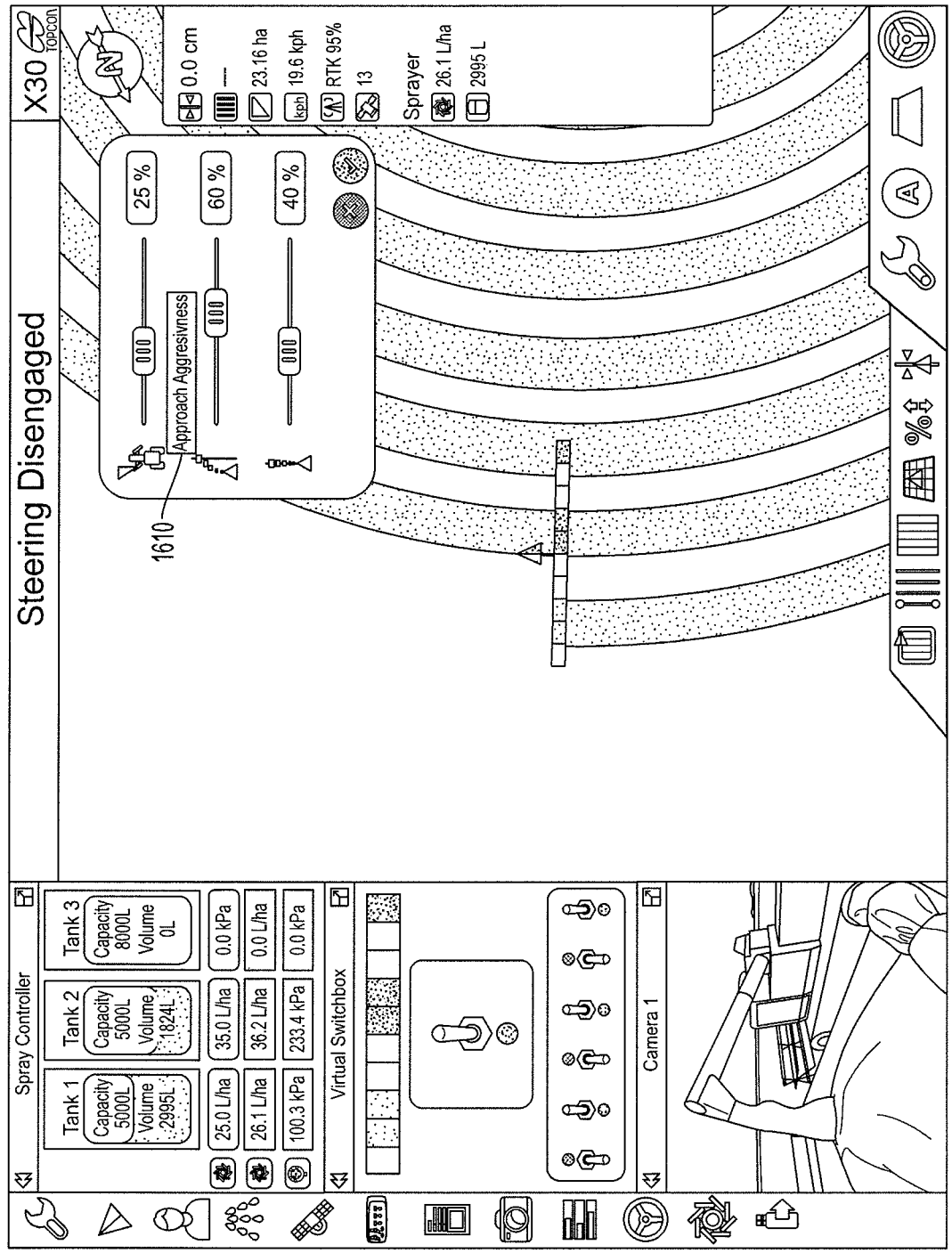
FIG. 16 shows the display screen showing tooltips to reduce text on screens for easier internationalization, according to a non-limiting embodiment.

FIG. 16 shows the display screen showing tooltips to reduce text on screens for easier internationalization, according to a non-limiting embodiment. FIG. 16 displays tool "tips" available via an off-screen button (not shown) to reduce text on-screen display for easier internationalization. In other words, the system allows a single button to turn on or turn off all on-screen informational text to assist the operator in fully understanding the intended function of the icon in question. As a result, the computer provides a description of each element in one or more languages. By relying on iconic display elements, the toggle enables easy internationalization of the screen elements, since activation of a helpful explanation 1610 increases the ease of use without resorting to an overcrowded display or one that is locked into a single language. The tool-tip feature also reduces the necessity for online, printed or separate user manuals or helps screens and reduces the amount of support overhead needed by the system manufacturer.

Figure 17:
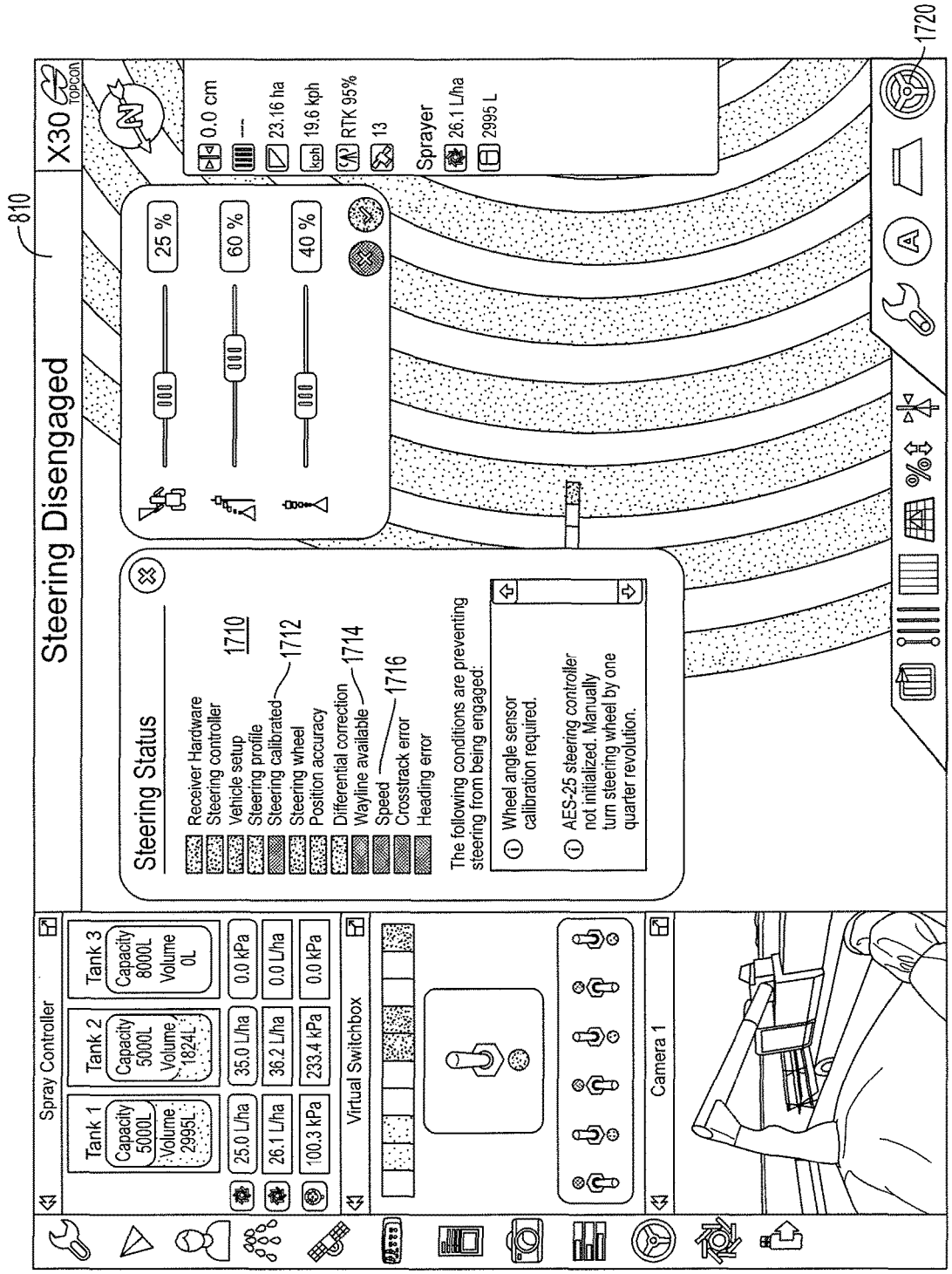
FIG. 17 shows the screen display with an activated popup status screen, according to a non-limiting embodiment.

FIG. 17 shows the screen display with an activated popup status screen, according to a non-limiting embodiment. FIG. 17 displays the steering status display 1710. The status 1710 is activated by the operator by touching icon 1720 on the dashboard 1420 to attempt engagement of the auto steering functionality. In this example, the status screen was activated in response to the operator's attempt to engage auto steering in the title bar 810. A purpose of panel 1710 is to provide the operator additional information about why the system could not execute his intended command to engage the auto steering functionality. For example, the alarm "Steering Disengaged" 810 flashes and the operator is left wondering "Why won't the steering engage?" The status display can either be manually activated or automatically pops up, with answers supplied using a minimum of language. The individual boxes next to each description may use colors (such as red and green) to communicate status to the operator, enabling them to easily determine the specific parameter limiting engagement function amongst a list of many possible inputs. In this example, the boxes 1712, e.g., can be shown with the color red to indicate where the operational problems lie without resorting to extended written explanations. Both colors as well as text may be utilized to help the operator understand which minimal calibration requirements or sensor feedback is not being met to allow for engagement of the intended function. Specifically, display 1710 shows the steering has not been calibrated 1712, does not have a way line 1714 and is not picking up speed 1716. As demonstrated by dialogue box 1710, this non-limiting embodiment involves pulling up the diagnostics on-screen and the operator never has to leave the home screen to see where the problems reside.

The arrangement, configuration, and operational sequence of all screen elements can vary by manufacturer, vehicle, or implement type. A user can set up the screen display layouts to mimic those screen arrangements used by other manufacturers. For example, a user may like the way a tractor display that they become accustomed to using appears and may want to then make all screens of all of their other equipment (irrespective of the manufacturer) look the same. Identical displays that are manufacturer "agnostic" can also reap significant advantages where there are a large number of different machines, all of which can be used by any operator that is trained on the "unified" display. For a company that has many workers operating different manufacturer versions of the same type of machine, a unified display reduces training time, saving a company significant costs. Also, an individual user can arrange elements in a way that mimics a particular manufacturer's screen so that the user also does not need training to operate a new device.

Figure 18:
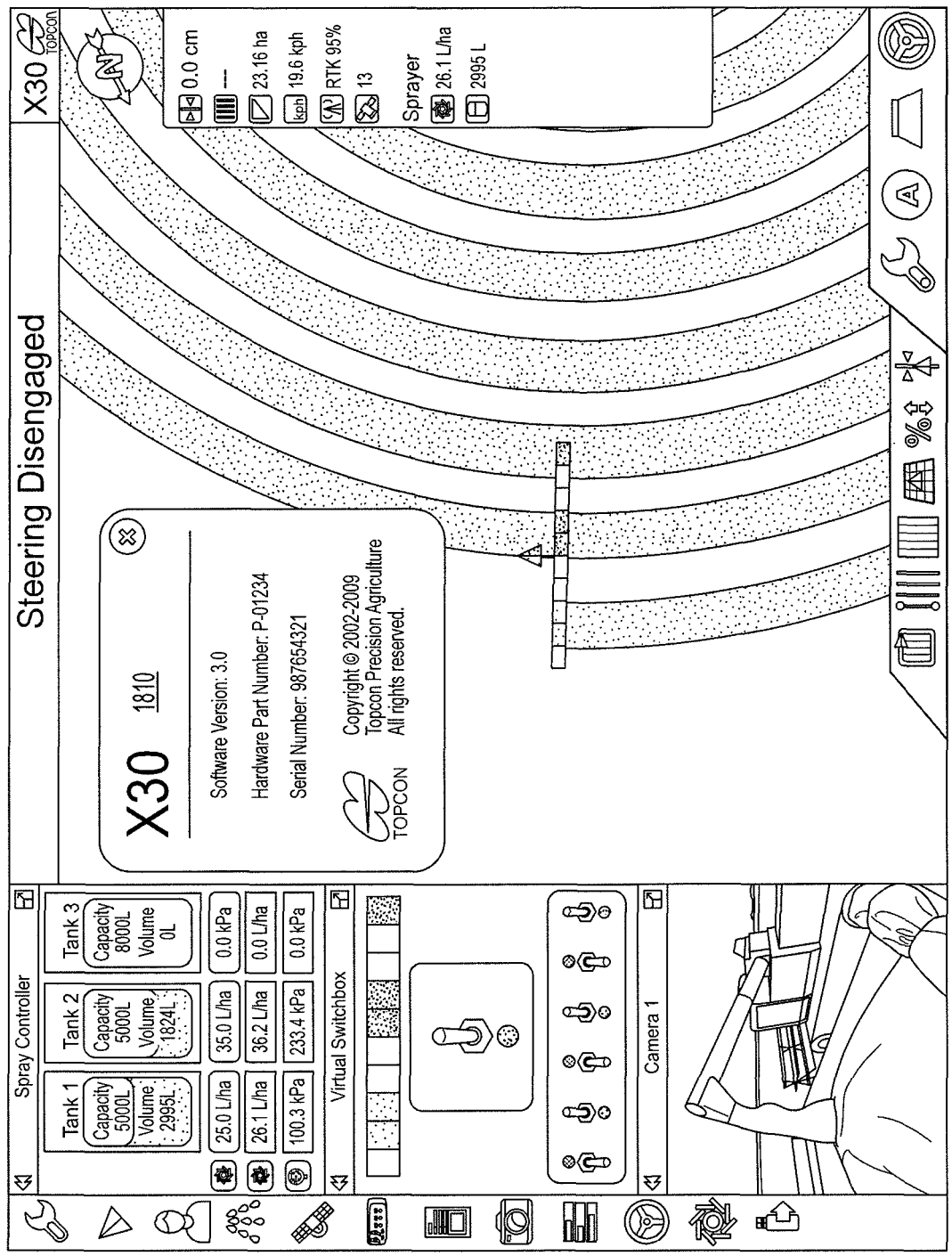
FIG. 18 shows a screen display of the about message, according to a non-limiting embodiment.

FIG. 18 shows a screen display of the about message, according to a non-limiting embodiment. FIG. 18 illustrates the software version information box that is displayed by the system upon activation.

Figure 19:
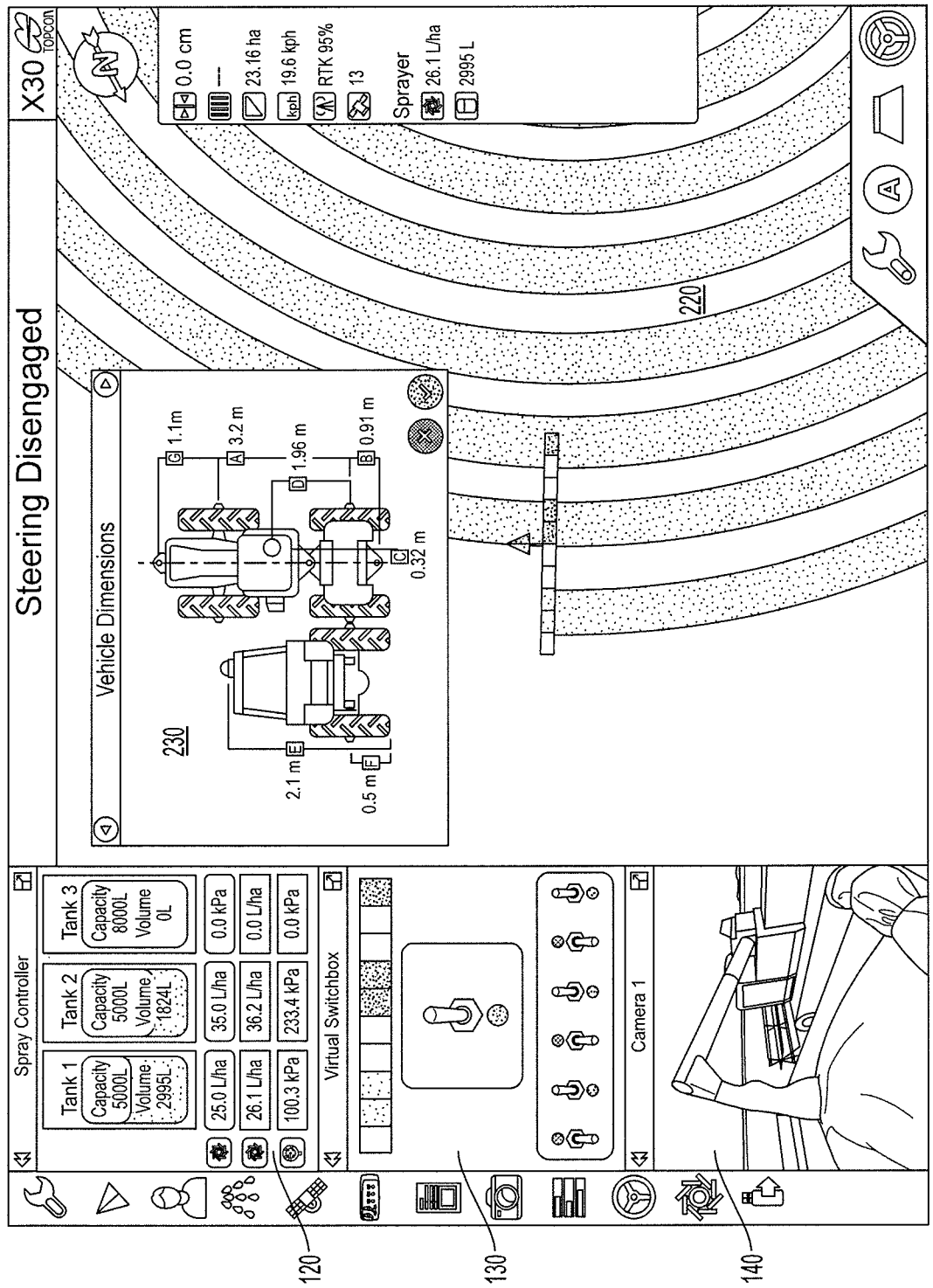
FIG. 19 illustrates the sample setup screen that can be accessed while the machine is stationary, according to a non-limiting embodiment.

FIG. 19 illustrates the sample setup screen that can be accessed while the machine is stationary, according to a non-limiting embodiment. Referring now to FIG. 19, the vehicle dimension screen 230 (as discussed previously in FIG. 2) is shown being displayed in a way that is segregated from mini-view screens 120, 130, and 140. Screen 230 is displayed outside of the working area 220. The icon used to activate vehicle dimension screen 230 is wrench 264. This mode is only available when the system is in an inactive status.

Figure 20:
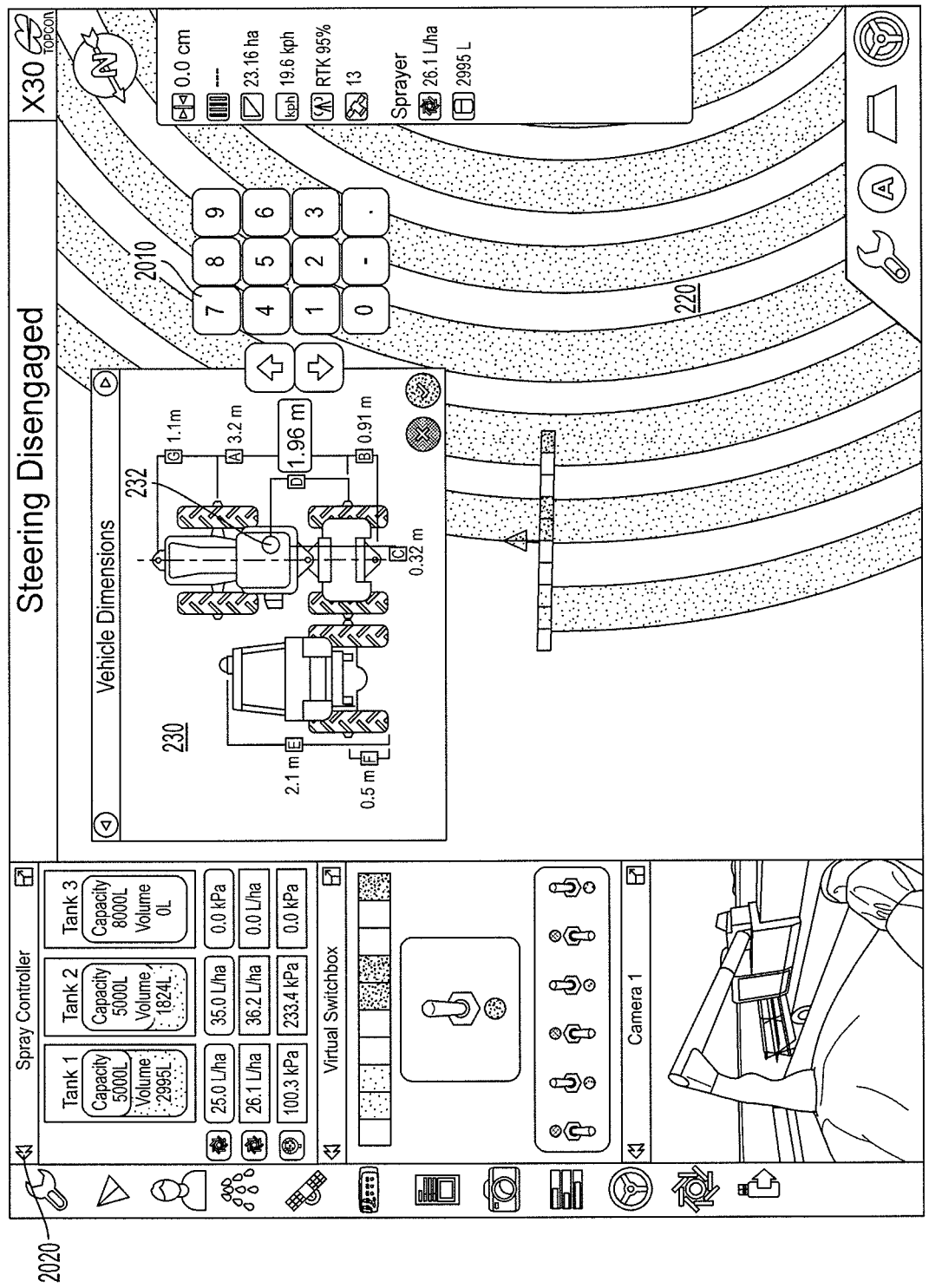
FIG. 20 shows the display screen with the numerical entry mode through the virtual number pad, according to a non-limiting embodiment.

FIG. 20 shows the display screen with the numerical entry mode through the virtual number pad, according to a non-limiting embodiment—e.g., in FIG. 20, user access outside the working area 220 for additional on-screen adjustments is shown. This provides the user both the graphical context of adjustment as well as the numeric keypad to input adjustments without leaving the Home or main working screen.

Specifically, FIG. 20 shows the user adjusting an offset (designated by distance B) relative to the location of sensor 232. Parameter B is the distance between the antenna receiver and the tractor rear axle. This offset is critical since everything on a vehicle guidance system is based on the position of the receiver 232 and may vary as the control system elements are installed onto the individual vehicle to be controlled. The receiver 232 is the only thing that is known geo-spatially. Everything else, when it comes to the tractor 10 or the implement 48 that it tows 108 has to be created through software intelligence. Fine tuning an offset thus becomes a critical parameter to precision guidance. Understanding and predicting various aspects of steering control given machine and implement geometry and physics has been embodied in a separate steering controller component (not illustrated). As shown, the offset value can be adjusted by use of the numeric screen pad 2010 which is located next to the displayed parameter and the respective parameter adjustment arrows. The numeric pad 2010 is an alternative for an operator who may desire a speedier input process, such as where adjustments are sizable and using an arrow will take a long time or require undue operator attention. The numeric pad 2010 is also superimposed over the work area 220, but the pad elements remain somewhat transparent so that the work area 220 is still visible.

Figure 21:
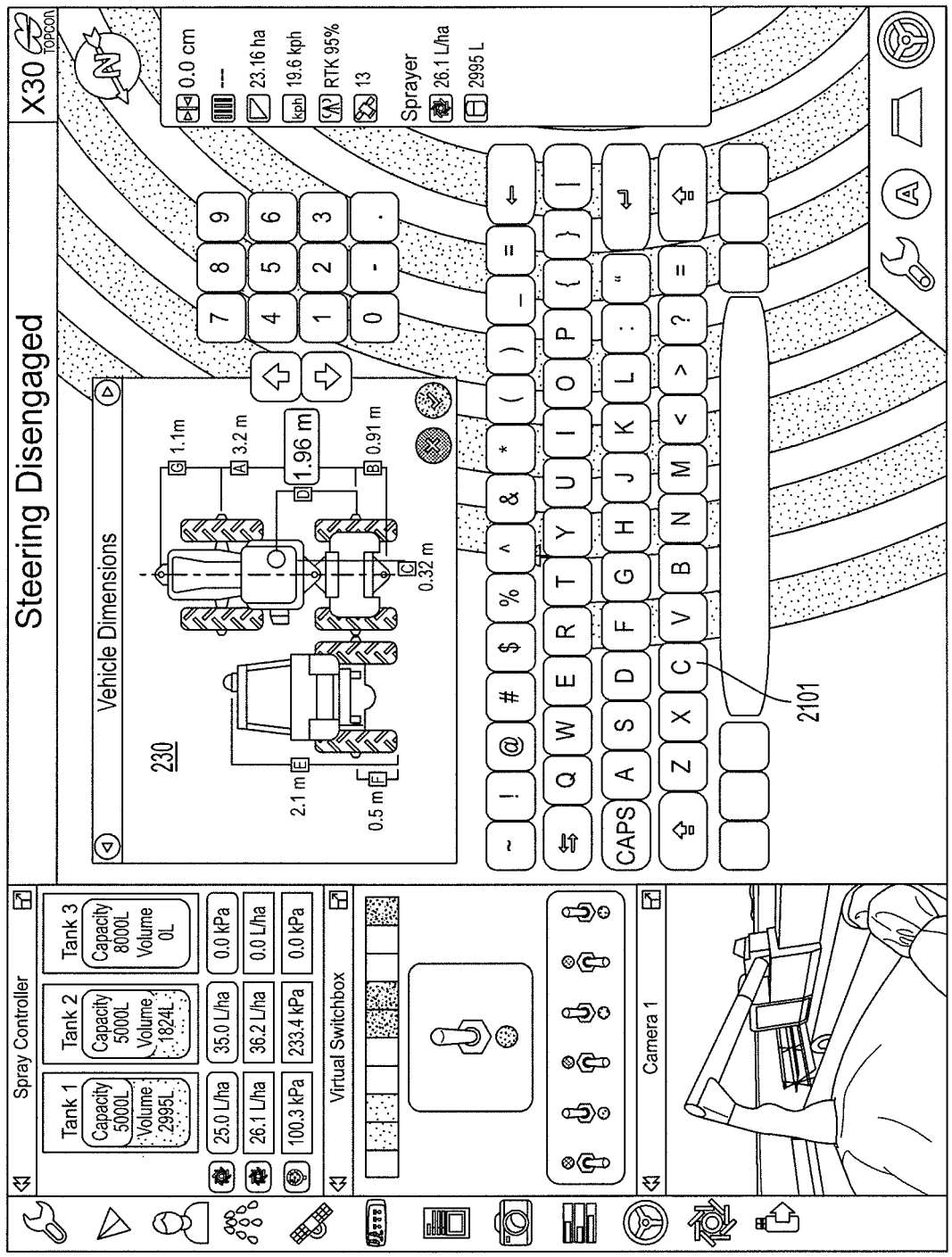
FIG. 21 illustrates the screen display with the alphanumeric entry mode via the virtual number pad and keyboard thereby illustrating the use of the keyboard on screen, according to a non-limiting embodiment.

FIG. 21 illustrates the screen display with the alphanumeric entry mode via the virtual number pad and keyboard thereby illustrating the use of the keyboard on screen, according to a non-limiting embodiment. FIG. 21 illustrates adding an extension "qwerty" keyboard 2101 used in conjunction with the fine tuning screen 230 and which enables the operator to enter alphanumeric data into the system, where needed.

A further feature of this non-limiting embodiment is that an operator is able to access or change screens through the input of a gesture (such as a finger swipe) or finger motion on or near touchscreen 64. For example, if the user wants to engage a keyboard, they may be able to access it by merely making a motion to raise the keyboard on the screen 64. The keyboard may also appear in an intuitive manner, such as when accessing a parameter that requires a name for later reference from a list or rather than a simple numeric value to be input.

Figure 22:
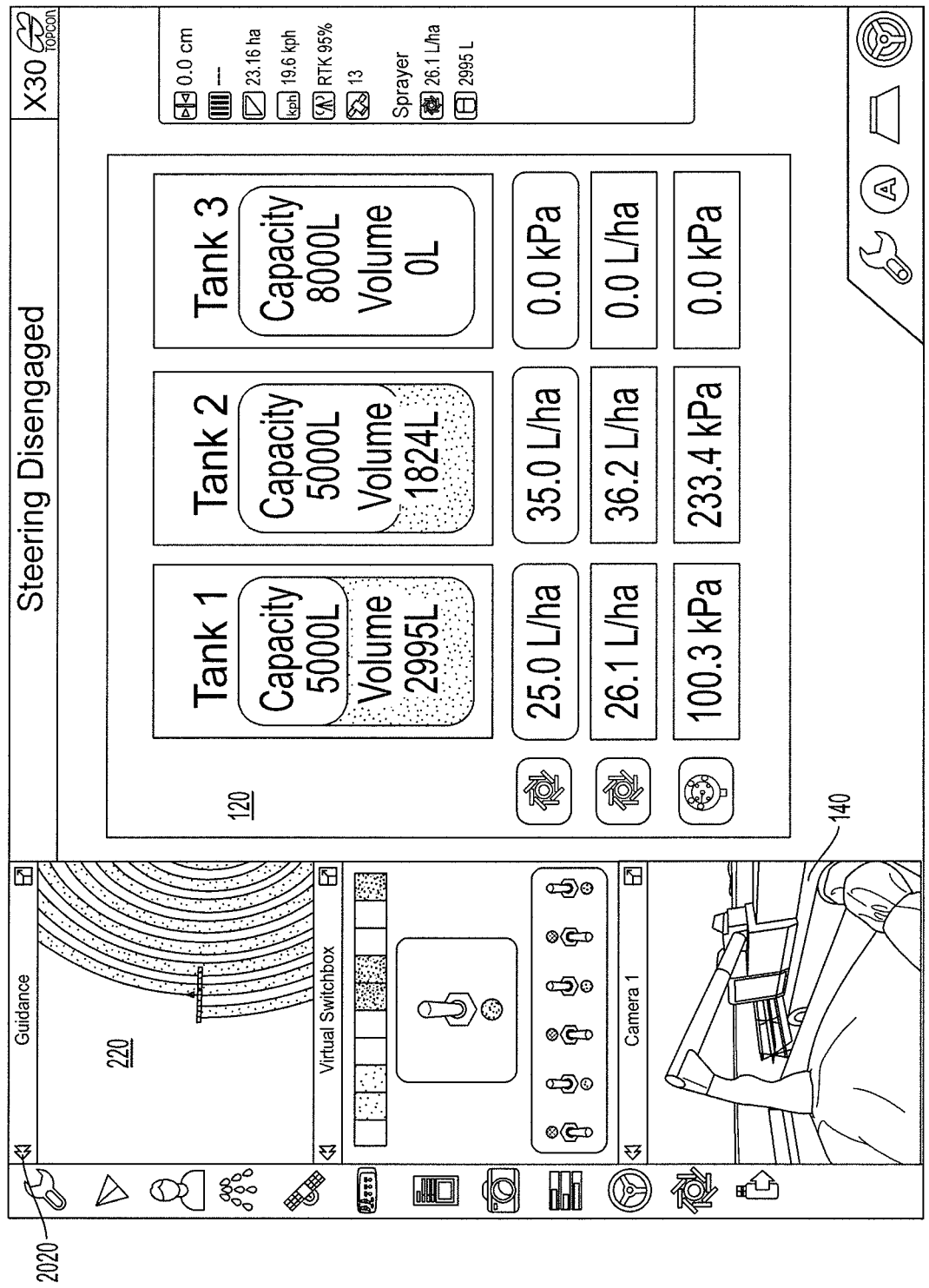
FIG. 22 is the large screen view of the spray controller mini view with a guidance map moved to the mini view, according to a non-limiting embodiment.

FIG. 22 is the large screen view of the spray controller mini view with a guidance map moved to the mini view, according to a non-limiting embodiment—as shown in FIG. 22, operational parameters of tank volume and volume remaining in tank are communicated both numerically and also graphically via the icon which will change with job progression. In addition, target application rate, actual application rate, and in line pressure are displayed. The screen illustrated in FIG. 22 also informs operator of both flow-based control and pressure-based control for individual channels. The system may employ either one of these control methods or a combination of these control methods on execution of application based rate control.

Specifically, FIG. 22 shows an enlarged version of mini view 120 which the operator can expand to zoom in on tanks 121, 122, and 123, and see the detailed flow control rates displayed below the tanks. The user has the ability to change the arrangement of individual tanks or the order of the rows. In FIG. 22, the working area 220 has been moved to be adjacent to the mini-view bar 160 and above mini view switch box 130. Consequently, a user can access and make tank flow adjustments as shown in FIG. 23 with a single gesture, while still observing the location of the implement 48 in work area 220. Once adjustments or viewing is complete, the mini-view can be reversed so that the display expands the working screen 220 to the default size shown in FIG. 1A et seq.

Some users think less about where their position is on the field 220 and are more interested in watching the rate control or the rate control loops. Another user may want to watch the variable rate map, while another user may want to watch the cameras 140 in order to have a larger view. Moreover, the user has the ability to inter-exchange mini-views and the larger working screen 220. Additionally, most of the applications in the present system (for example the sprayer rate controller) can be presented to the user in different levels. At one level the applications can be shown in the dashboard panel where the monitoring of critical operations can occur based on user selections. There are no controls at the dashboard level. At another level, the applications can be shown as part of the mini-views. This level enables an operator to have access to an application's operational data and also provides the operator with the most critical application controls. A third level is the full screen view of the application which provides full operational information and control capabilities. Whatever the interest, the display configuration of non-limiting embodiments of the present application create numerous options and levels without sacrificing ease of use, simplicity of presentation, and a personalized graphic user interface. Specifically, non-limiting embodiments of the present application provide a mechanism for switching between mini-views and full screen views, either by pressing the maximize button or simply utilizing an on screen gesture with their fingertip (shown as element 2020 in FIG. 20). Similarly, non-limiting embodiments of the present application provide an easy to use mechanism for closing levels, such as mini-views, by having the operator either press on the hide button (element 2020 in FIG. 24) or by sliding the mini view to the left on the navigation bar.

Figure 24:
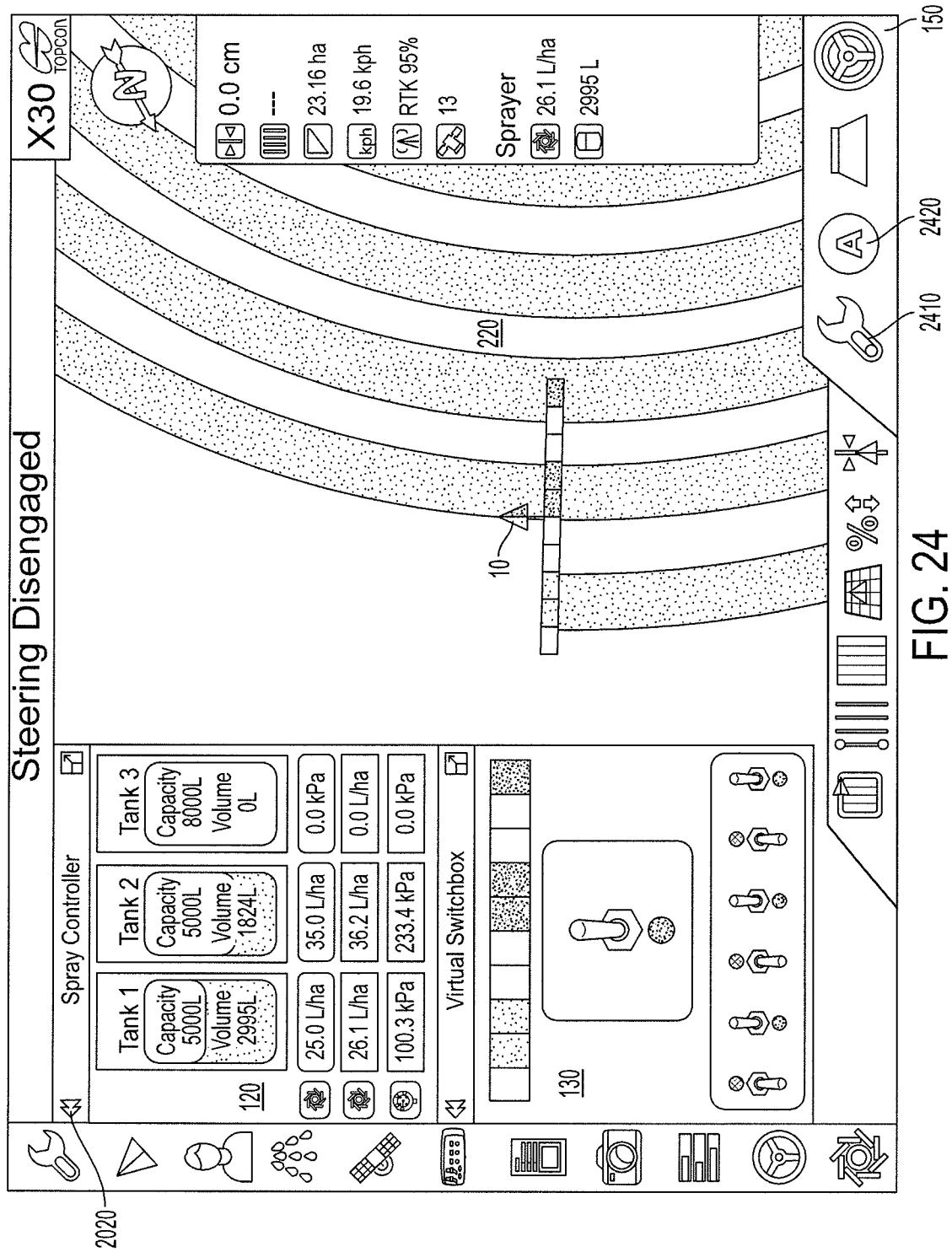
FIG. 24 illustrates a small console version of the display with two mini views and the operational screen in use, according to a non-limiting embodiment.

FIG. 24 illustrates a small console version of the display with two mini views and the operational screen in use, according to a non-limiting embodiment. In particular, FIG. 24 illustrates operational details regarding dashboard 150 as embodied on a smaller physical screen requiring a restricted number of mini-views to maintain optimal viewability on the correspondingly smaller and restricted screen size, with different screen pixel resolution, or embodied on a different set of hardware. In this embodiment, the dashboard 150 provides various tractor guidance parameters. As previously shown, the ability to dynamically adjust how dashboard 150 appears and what information it displays is part of the non-limiting embodiments of the present application. In other words, the screen size can dynamically dictate the arrangement, resolution, and parameters shown by non-limiting embodiments and the user can choose what they want to see, and the system can dynamically arrange the elements based on a user's inputs. In the end, the user gets what they want to see and where they want it on the screen. For example, one user might want to see speed, direction heading, and swath width; since guidance can be provided dynamically as the implement 48 moves through the field 220. The dashboard 150 provides a quick view of guidance and rate control in a smaller area compared to the mini-views 120 and 130. When users want to look at a map display, i.e., the large guidance screen 220, and they want to occupy the entire space and do not want any mini-views obstructing their view, they can put some information in an abbreviated format down into the dashboard area 150 with a simple drag operation.

Certain areas of the display therefore allow a user to monitor and in other areas adjust detailed operating parameters without leaving the main screen.

Another aspect of this non-limiting embodiment is the ability to determine what goes in a dashboard area, and uniquely order the dashboard elements to have higher functions within that dashboard and monitoring area.

Figure 25:
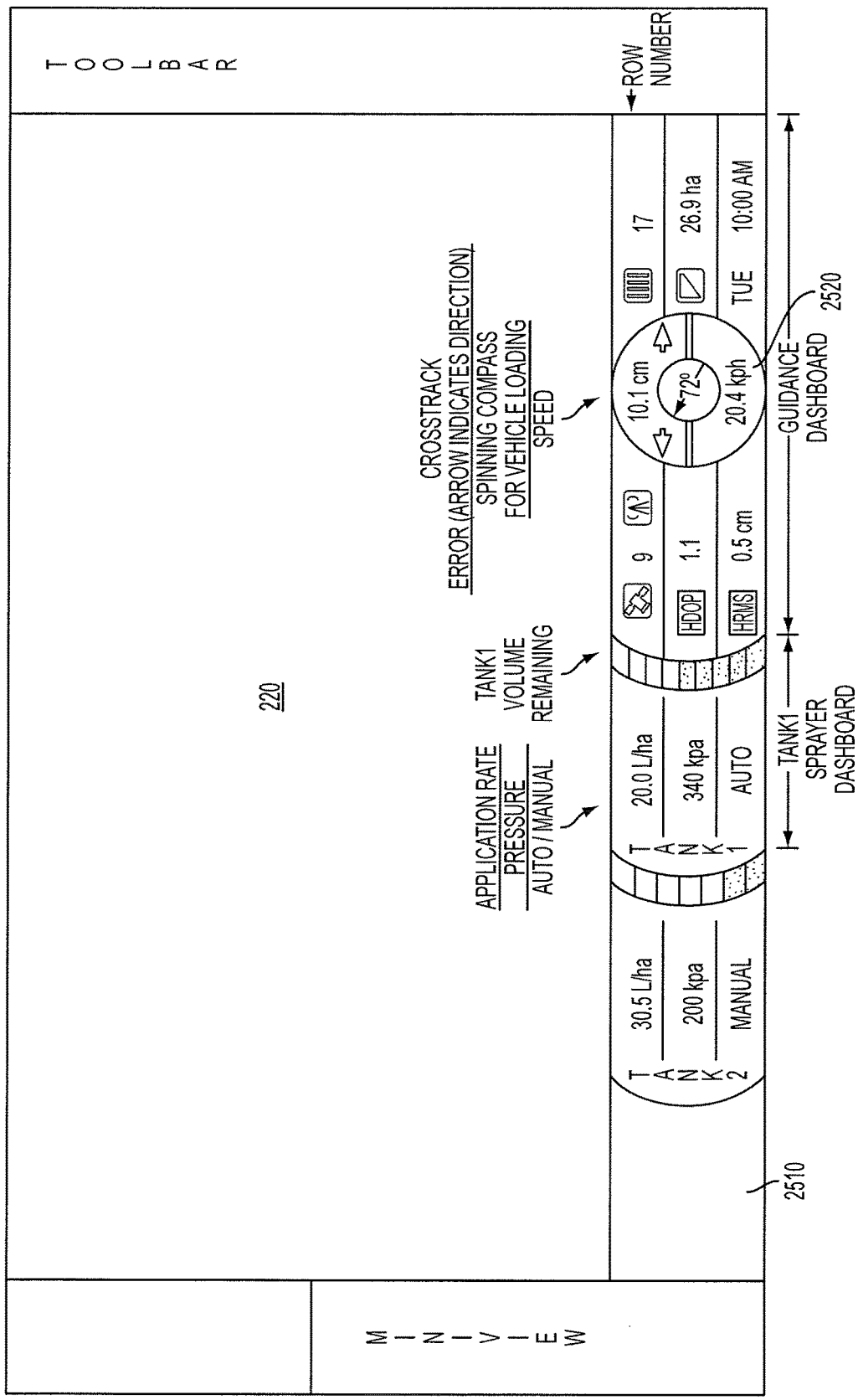
FIG. 25 is an alternative embodiment of the system toolbar designed for eye level view maximization, according to a non-limiting embodiment.

FIG. 25 is an alternative embodiment of the system toolbar designed for eye level view maximization, according to a non-limiting embodiment. In particular, FIG. 25 is an alternative view of the dashboard 150 located at the bottom of working area 220. In this embodiment, the system provides information in different areas around central eye 2520, so that a user can view crucial system information in a manner that does not interfere with the middle area of a user's space. Alternatively, a user can configure crucial system information (including, but not limited to, "alarms"), so that they appear differently in the eye space (i.e., working area 220) or off to a dashboard 2510 or title bar 810.

Figure 27:
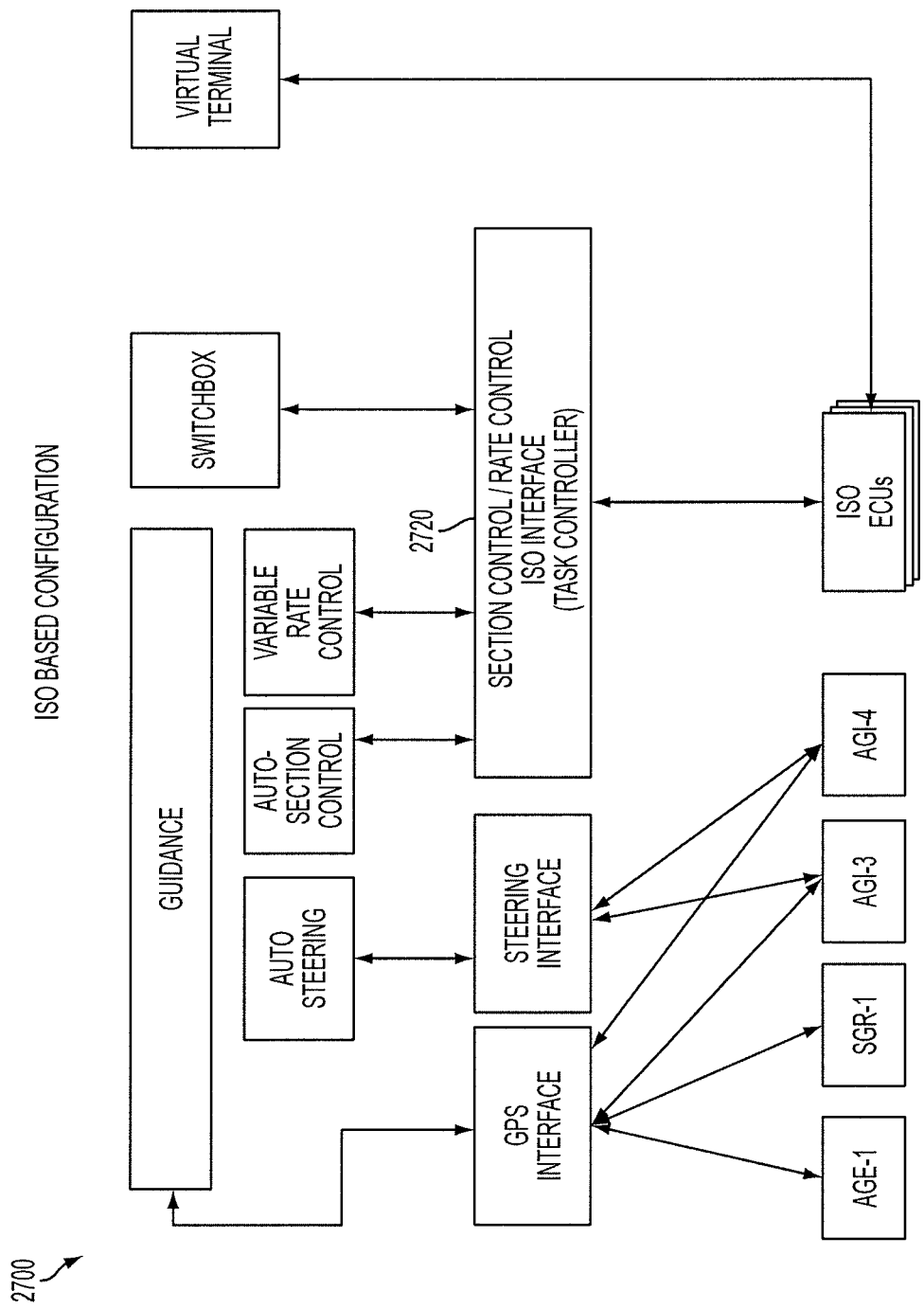
FIG. 27 is an architectural block diagram of the system as implemented on an ISO based configuration, according to a non-limiting embodiment.
Figure 28:
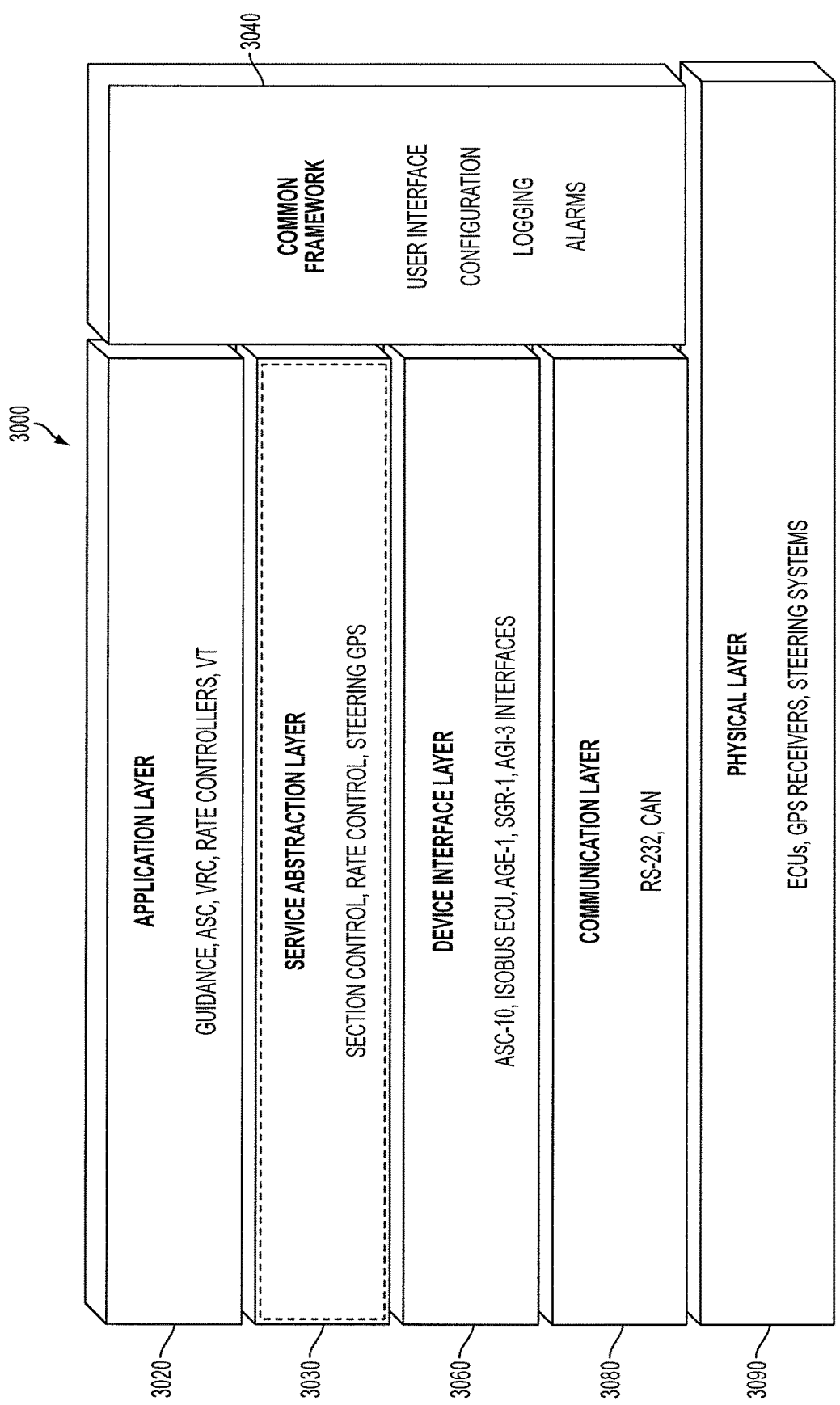
FIG. 28 is a diagram of the layer stack architecture, according to a non-limiting embodiment.

Non-limiting embodiments of the present application are used to control the dispensing of any type of material of any form, including but not limited to liquid, granular, or gaseous materials utilizing a variety of control mechanisms, measurement devices and sensing elements. The control mechanisms as illustrated in FIGS. 26-28 therefore represent an exemplified subset of the systems and materials that can be used with the system.

Figure 26:
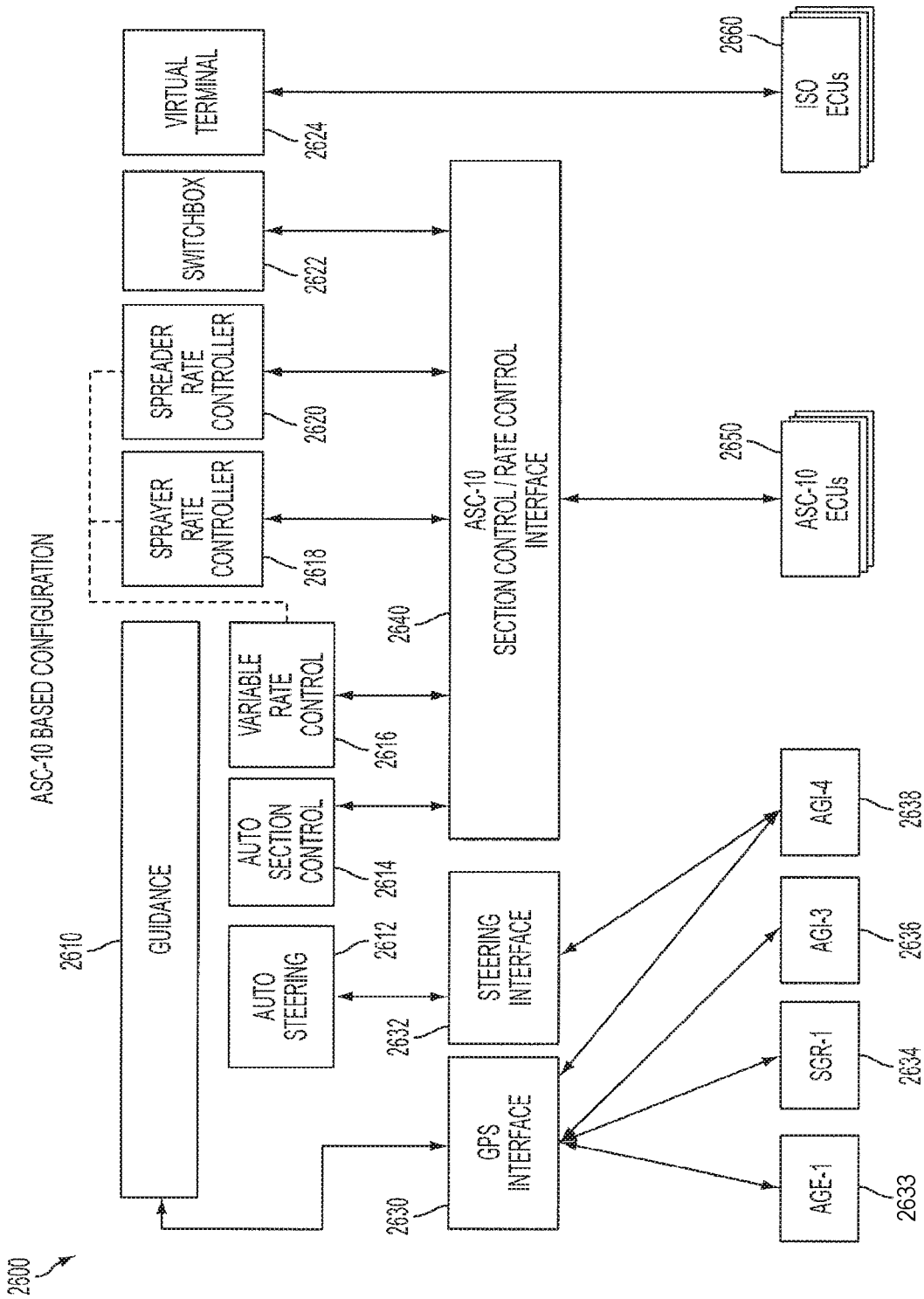
FIG. 26 is an architectural block diagram of the system as implemented on an ASC-10 platform, according to a non-limiting embodiment.

FIG. 26 is an architectural block diagram of the system as implemented on an ASC-10 platform, according to a non-limiting embodiment. In particular, FIG. 26 illustrates the system architecture 2600 that communicates with an Automatic Section Control (ASC-10) device manufactured by Topcon Precision Agriculture. As shown, the system 2600 comprises external application modules 2633, 2634-2638, 2650 and 2660, as well as functions or modules that are implemented inside the system. System 2600 can be implemented in hardware or as a software application that is programmed to interface with the ASC-10 electronic control unit (ECU). The boxes 2610-2624 meanwhile are functional modules while boxes 2630, 2632 and 2640 are communication interface modules which handle communication protocols, commands and functions that are sent to and received from the external hardware application modules.

The guidance module 2610 is used in conjunction with the GPS positioning system to determine whether the tractor 10 is following a guideline or not. The guidance module 2610 informs the tractor operator visually whether they are following a system guidance line through the use of GNSS positioning. The modules 2612-2616 are subset functions of the guidance function 2610. Thus, if guidance 2610 tells the operator where they are located, auto steering 2612 facilitates moving the tractor 10. Auto Section control 2614 indicates to the system which sections of the implement 48 to turn on or turn off based on tractor position data from the guidance module 2610. Therefore, the Auto Section Control 2614 enables the operator or system to make a logical decision based in part of the geometry of the implement 48 and the position of the tractor so as to avoid, for example, double spraying the same area. The variable rate control 2616 uses a prescription map that prescribes different spray rates for different areas of a map. Based on inputs for the guidance module, the control 2616 optimizes that rate of application based on position, as well as other inputs such as tractor speed, prescription map information or information from other sensors (e.g. crop conditions).

The sprayer and spreader rate controllers 2618 and 2620 respectively control equipment responsible for the amount of dispensed product. The sprayer controller 2618 handles fluid applications and the spreader controller 2620 dry material applications continually. The sprayer rate controller receives a target spray rate value form the variable rate controller 2616 and adjusts spray rate by processing other variables such as vehicle speed and width of implement 48 to continuously maintain the provided target rate whereby adjustments to the sprayer control valve are made on the fly. The spreader rate controller 2620 operates on the same parameters controlling dry material dispenser equipment on the implement 48.

Switchbox 2622 is a manual version of the auto section control 2614. The manual switches are operated as previously described in conjunction with mini view 130 (FIG. 5). The virtual terminal 2624 communicates directly with an ISO standard ECU to provide functional components to the operator on a virtualized screen display. As shown in FIGS. 1-24 these virtualized elements are shown as many of the views that are expanded or minimized by the operator, such as the min view stacks 120.

The GPS interface 2630 represents a set of functions that facilitate data transfer from the satellite receiver and related controller elements 2632-2638, such as a string of position data to the guidance module 2610. The interface converts the input data stream into the relevant data format needed by guidance module 2610. Data from the guidance module provides an outbound signal containing corrections for the tractor 10.

The steering interface 2632 corresponds to the steering controllers in the receiver 2633 and 2634-2638. The receivers tell the guidance module 2610 what the controllers are doing at the moment. The guidance module 2610 in return informs the controllers tuning/steering parameters, i.e. how the steering should behave in certain environments.

The ASC 10 module 2640 receives parameters from numerous functional controllers and in turn controls physical elements of the tractor 10. The two way nature of the communication is based on feedback from physical devise, e.g. valve open, section on/off reported back to the relevant control modules e.g. ASC-10 ECU 2650 signals to 2640 that a relay closes implement section which is reported back to the switchbox module 2622.

FIG. 27 is an architectural block diagram of the system as implemented on an ISO based configuration, according to a non-limiting embodiment. Referring to FIG. 26, the ISO ECU based configuration (which is based on ISO protocol 11783) 2700 has similar functional elements as system 2600 based on the ASC-10 ECU except for task controller 2720 which is designed to perform task control with the ISO ECU. Moreover, since the ISO protocol includes sufficient processing power to manage spray control and spreader control parameters, these functions are not needed in the functional modules shown in FIG. 27.

FIG. 28 is a diagram of the layer stack architecture, according to a non-limiting embodiment. In particular, FIG. 28 is a diagram of the functional layers 3000 comprising this non-limiting embodiment. The application layer 3020 is where decisions for software commands operating the system occur. The listed functions comprising layer 3020 (e.g. guidance, rate controllers) are described in FIG. 27; the service abstract layer 3030 executes the commands generated in the applications layer 3020 and communicates any external command that layer 3020 needs to have implemented in the system. Thus auto section control (ASC) will tell the service layer 3030 to pull the section control functions form the external device/controller. The device interface layer 3060 translates the executed commands from the layer 3030 in order to then communicate with the external device. Thus layer 3060 operates in a manner to a peripheral device driver for a computer. The communication layer 3080 converts the driver signal into appropriate standard formats for the ISO ECU (known as J1939 for agricultural communications). The physical layer 3090 are the actual devices like ECU's, valves, sensors, relay, etc. The common framework layer 3040 represents the GUI illustrated in FIGS. 1A-24. As previously described, the layer 3040 communicates and is connected to all of the system layers 3020-3090. For example, the common framework layer 3040 can tell the device layer 3060 what device is connected. Alternatively, if an alarm is generated by the communication layer 3080, that signal goes directly to the common framework to alter the operator about the problem.

One or more programs including instructions for performing a method according to exemplary embodiments in a computer can be recorded as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and the like. The computer-readable recording medium can also be distributed over network coupled computer systems so that the computer-readable code is stored and executed in a distributed fashion.

Without further analysis, the foregoing will so fully reveal the teachings of the present invention that others can by applying current knowledge without undue experimentation can readily adapt it for various applications outside of the machines described in detail herein. While the invention has been described as embodied in a method and a system for monitoring certain machine operations, including agricultural machines, it is not intended to be limited to the details shown since various modifications and structural changes may be made without departing from the spirit of the present invention.

In other words, while one or more exemplary embodiments have been described with reference to the figures, it will be understood by those of ordinary skill in the art that various changes in form and details may be made therein without departing from the spirit and scope of the inventive concept as defined by the following claims. The exemplary embodiments should be considered in a descriptive sense only and not for purposes of limitation. Therefore, the scope of the exemplary embodiments is defined not by the detailed description but by the appended claims, and all differences within the scope will be construed as being included in the inventive concept.

What is claimed is:

1. A method comprising:
    displaying, using a processor, a plurality of views on a screen associated with a display, each of the plurality of views corresponding to a plurality of functions, at least one function of the plurality of functions associated with an activity performed by a machine in a work area, and the displaying of the plurality of views on the screen providing for the display of an unrestricted and variable number of the views of the plurality of views together with an unrestricted and variable placement of one or more functions of the plurality of functions within any particular one view of the plurality of views, and wherein (i) a total number of the views for the displaying on the screen, (ii) a total number of the functions appearing in the any particular one view, and (iii) which ones of the functions appear in the any particular one view, such that each of the foregoing (i)-(iii) are unrestricted and variable and one or more of the foregoing (i)-(iii) are dynamically adjusted for display on the screen as the machine traverses the work area, and wherein at least one function of the one or more functions within the any particular one view of the plurality of views is viewable and adjustable remotely in real-time; and
    allowing a user of the machine to simultaneously monitor, using the display, a field of operation associated with the work area and the one or more functions; and
    controlling, using the display, the machine in the work area using the one or more functions by way of one or more of the plurality of views.

2. The method of claim 1, further comprising
    displaying one or more view of the plurality of views around a central eye on the screen, the central eye located at a position on the screen removed from a main viewing area central to the screen.

3. The method of claim 2, wherein the method further comprises allowing the user to control, via the display, the activity using software executed on the machine while monitoring the work area, and receiving, from a remotely located machine, an adjustment to the at least one function of the one or more functions within the any particular one view of the plurality of views, and adjusting the at least one function according to the adjustment for display.

4. The method of claim 1, wherein the machine is a tractor, and the plurality of functions controlled by the user are performed by an implement connected to the tractor, the implement selected from a group consisting of a spreader for fertilizer, a planter of seed, a spraying device, a cutting edge, and a forage harvester.

5. The method of claim 2, wherein the one or more view and the central eye are displayed within a dashboard displayed in the position on the screen removed from a main viewing area central to the screen.

6. The method of claim 1, wherein the variable placement of the one or more functions within the any particular one view of the plurality of views includes the variable placement of the plurality of functions.

7. An apparatus comprising:
    one or more processors configured to:
    display a plurality of views on a screen associated with a display, each of the plurality of views corresponding to a plurality of functions, at least one function of the plurality of functions associated with an activity performed by a machine in a work area, and the displaying of the plurality of views on the screen providing for the display of an unrestricted and variable number of the views of the plurality of views together with an unrestricted and variable placement of one or more functions of the plurality of functions within any particular one view of the plurality of views, and wherein (i) a total number of the views for the display on the screen, (ii) a total number of the functions appearing in the any particular one view, and (iii) which ones of the functions appear in the any particular one view, such that each of the foregoing (i)-(iii) are unrestricted and variable and one or more of the foregoing (i)-(iii) are dynamically adjusted for display on the screen as the machine traverses the work area, and wherein at least one function of the one or more functions within the any particular one view of the plurality of views is viewable and adjustable remotely in real-time; and allow a user of the machine to simultaneously monitor, using the display, a field of operation associated with the work area and the one or more functions; and control, using the display, the machine in the work area using the one or more functions by way of one or more of the plurality of views.

8. The apparatus of claim 7, wherein the one or more processors are further configured to:

display one or more view of the plurality of views around a central eye on the screen, the central eye located at a position on the screen removed from a main viewing area central to the screen.

9. The apparatus of claim 8, wherein the one or more view and the central eye are displayed within a dashboard displayed in the position on the screen removed from a main viewing area central to the screen.

10. The apparatus of claim 7, wherein the machine is a tractor, and the plurality of functions controlled by the user are performed by an implement connected to the tractor, the implement selected from a group consisting of a spreader for fertilizer, a planter of seed, a spraying device, a cutting edge, and a forage harvester.

11. The apparatus of claim 10, wherein the one or more processors are further configured to:

determine, as the tractor traverses the work area, a user-defined arrangement of one or more of the plurality of functions for the user; and present, on the screen, the user-defined arrangement as a home screen for the user.

12. The apparatus of claim 7, wherein the variable placement of the one or more functions within the any particular one view of the plurality of views includes the variable placement of the plurality of functions, and wherein the one or more processors are further configured to:

receive, from a remotely located machine, an adjustment to the at least one function of the one or more functions within the any particular one view of the plurality of views, and adjust the at least one function according to the adjustment for display.

13. A non-transitory computer-readable medium storing a program for executing a method which, when executed on a processor, cause the processor to perform operations comprising:

displaying, using the processor, a plurality of views on a screen associated with a display, each of the plurality of views corresponding to a plurality of functions, at least one function of the plurality of functions associated with an activity performed by a machine in a work area, and the displaying of the plurality of views on the screen providing for the display of an unrestricted and variable number of the views of the plurality of views together with an unrestricted and variable placement of one or more functions of the plurality of functions within any particular one view of the plurality of views, and wherein (i) a total number of the views for the displaying on the screen, (ii) a total number of the functions appearing in the any particular one view, and (iii) which ones of the functions appear in the any particular one view, such that each of the foregoing (i)-(iii) are unrestricted and variable and one or more of the foregoing (i)-(iii) are dynamically adjusted for display on the screen as the machine traverses the work area, and wherein at least one function of the one or more functions within the any particular one view of the plurality of views is viewable and adjustable remotely in real-time; and allowing a user of the machine to simultaneously monitor, using the display, a field of operation associated with the work area and the one or more functions; and controlling, using the display, the machine in the work area using the one or more functions by way of one or more of the plurality of views.

14. The non-transitory computer-readable medium of claim 13, wherein the operations further comprise:

displaying one or more view of the plurality of views around a central eye on the screen, the central eye located at a position on the screen removed from a main viewing area central to the screen.

15. The non-transitory computer-readable medium of claim 14, wherein the user controls, via the display, the activity using software executed on the machine while monitoring the work area.

16. The non-transitory computer-readable medium of claim 13, wherein the machine is a tractor, and the plurality of functions controlled by the user are performed by an implement connected to the tractor, the implement selected from a group consisting of a spreader for fertilizer, a planter of seed, a spraying device, a cutting edge, and a forage harvester.

17. The non-transitory computer-readable medium of claim 14, wherein the one or more view and the central eye are displayed within a dashboard displayed in the position on the screen removed from a main viewing area central to the screen.

18. The non-transitory computer-readable medium of claim 13, wherein the variable placement of the one or more functions within the any particular one view of the plurality of views includes the variable placement of the plurality of functions, and the operations further comprise:

receiving, from a remotely located machine, an adjustment to the at least one function of the one or more functions within the any particular one view of the plurality of views, and adjusting the at least one function according to the adjustment for display.

* * * * *